US007148661B2

(12) United States Patent
Trainer et al.

(10) Patent No.: US 7,148,661 B2
(45) Date of Patent: Dec. 12, 2006

(54) MULTI-PULSE CONVERTER CIRCUITS

(75) Inventors: David Trainer, Alveston (GB); Andrew J. Forsyth, Withington (GB); Francisco J. Chivite-Zabalza, Selly Oak (GB)

(73) Assignee: Goodrich Control Systems Limited, Solihull (GB)

( * ) Notice: Subject to any disclaimer, the term of this patent is extended or adjusted under 35 U.S.C. 154(b) by 247 days.

(21) Appl. No.: 10/969,436

(22) Filed: Oct. 20, 2004

(65) Prior Publication Data

US 2005/0146226 A1 Jul. 7, 2005

(30) Foreign Application Priority Data

Oct. 27, 2003 (GB) ................................ 0325067.7

(51) Int. Cl.
*G05F 1/70* (2006.01)

(52) U.S. Cl. ........................................ 323/207; 363/68

(58) Field of Classification Search ................ 323/207, 323/205; 363/89, 86, 68
See application file for complete search history.

(56) References Cited

U.S. PATENT DOCUMENTS 6,462,518 B1 * 10/2002 Fischer et al. .............. 323/207

* cited by examiner

*Primary Examiner*—Shawn Riley
(74) *Attorney, Agent, or Firm*—Wolf, Greenfield & Sacks, P.C.

(57) ABSTRACT

An AC to DC converter with harmonic suppression is provided. The harmonic suppression is provided by forcing an instantaneous current conflict between series connected rectifier bridges 54, 80, such that a voltage waveform at 6 times the AC supply frequency of the AC supply is automatically generated. This waveform is then injected via a injection circuit to give harmonic cancellation.

17 Claims, 21 Drawing Sheets

Fig. 8a
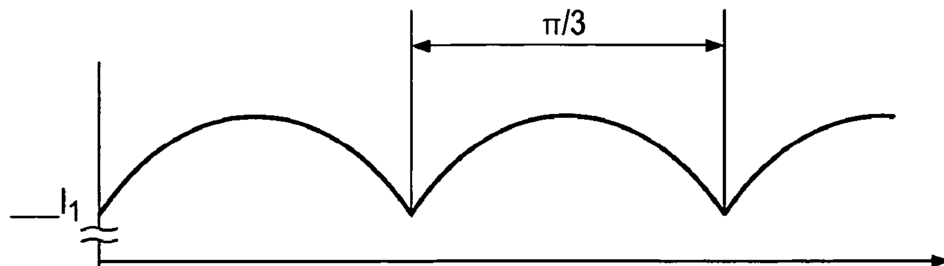
Fig. 8b
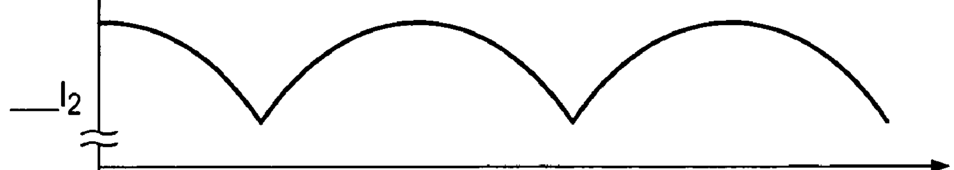
Fig. 8c
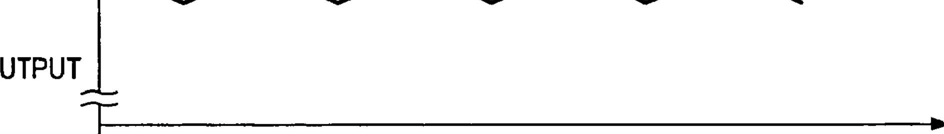
Fig. 8d
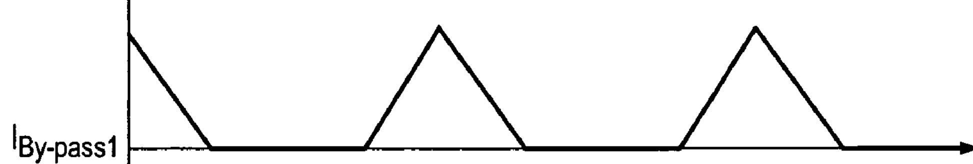
Fig. 8e
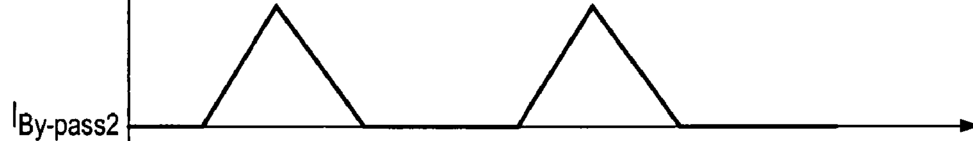
Fig. 8f
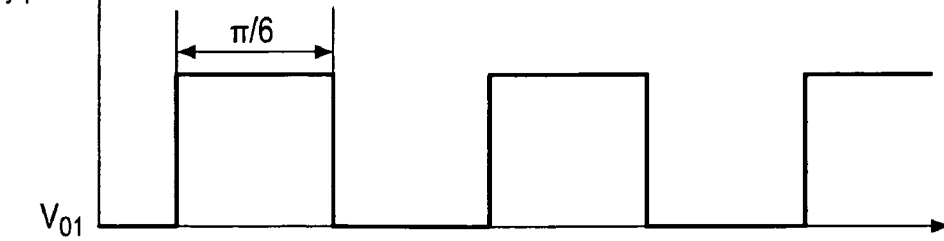
Figs. 8a-8f Production of the 24-pulse waveform $V_{RN}$ Production of the 36-pulse waveform $V_{RN}$

MULTI-PULSE CONVERTER CIRCUITS

FIELD OF THE INVENTION

The present invention relates to a multi-pulse converter circuit for performing conversion between an alternating current and a direct current.

BACKGROUND OF THE INVENTION

A typical power distribution system comprises a generator connected via some distribution network to one or more loads. The generator is typically a multiphase generator and the voltage output on each phase is nominally sinusoidal. If the generator supplies a purely resistive load, then the current drawn from the generator will also be sinusoidal, and is also in phase with the voltage. If the generator is connected to a load with a significant reactive component then the relationship between the current and voltage becomes altered and the current starts to move out of phase with the voltage thereby giving rise to additional distribution losses and also de-rating the maximum capacity of the power source. Furthermore, if the load is non-linear then it tends to draw a distorted current (i.e. not sinusoidal current) from the generator. These distortions can give rise to harmonic variations in voltage which are seen by other loads connected to the generator. These distortions may affect the performance of these other loads, as well as degrading the performance of the power supply system. Thus it is well known that it is desirable to keep harmonic distortion low.

Aeronautical systems represent a particular challenge to control of harmonic distortion. This is because in some modern aircraft the generators typically operate over a wide frequency range, and thus methods of reducing harmonic distortion using filters that work well with fixed frequency systems cannot be used in aeronautical systems. Furthermore, many of the flight surfaces may be electrically actuated and these actuators can by virtue of their variable speed drives or power supply arrangement impose significant non-linear electrical loads. Finally, solutions for providing control of harmonic distortion often involve the use of transformers. These transformers have to be rated to be able to handle the maximum power that is to be transferred across them together with an acceptable margin of safety. Transformers capable of handling large amounts of power tend to be relatively heavy.

Variable speed controllers and DC converters are often based on a three phase bridge circuit, an example of which is shown in FIG. 5. Such a bridge circuit is also known as a 6 pulse bridge because there are six pulses per cycle—this being formed on one per half cycle for each of the three phases.

In theory a six pulse bridge circuit produces current harmonics at 6n+1 and 6n−1, where n is an integer, i.e. at 5, 7, 11, 13, 17, 19 and so on times the fundamental frequency. Also the magnitude of each harmonic is approximately a reciprocal of its harmonic number. Consequently there would be 20% fifth harmonic, 14% seventh harmonic, 9% eleventh harmonic and so on.

In principle there are no even-order harmonics because the bridge circuit is a full wave rectifier.

SUMMARY OF THE INVENTION

According to a first aspect of the present invention there is provided a converter circuit for converting between an alternating current (AC) supply and a direct current (DC) load, the converter circuit comprising:

a first semiconductor bridge circuit having first and second DC rails, and a plurality of AC rails for connection to an AC bus;

at least one further semiconductor bridge circuit having first and second DC rails and a plurality of AC rails;

at least one phase shifting device; and a harmonic injector, wherein the or each phase shifting device interconnects an associated one of the further semiconductor bridge circuits to the AC bus, the semiconductor bridge circuits are connected in series, the harmonic injector is responsive to a harmonic signal developed across at least one of the semiconductor bridge circuits and uses this to form a signal which is used to reduce harmonic interference in the AC bus.

In order to ensure that the current mismatches give rise to the generation of repetitive waveforms across each semiconductor bridge circuit there are no current paths that are completely individual to any one of the bridge circuits. Thus there are no components, such as DC filtering/smoothing capacitors, connected solely across the output of the individual semiconductor bridge circuits. Where series connected capacitors form a chain of capacitors between the positive and negative DC output rails of the converter circuit such that a "central node" is formed, any connection between the central node and a node between the first and second semiconductor bridges is via a shared path and via at least one intermediate component. The intermediate component is advantageously part of the harmonic injector.

Preferably the AC supply is a three phase supply.

Preferably the converter circuit is a rectifier for converting an AC supply to a DC supply. The AC supply need not be at a fixed frequency as the rectifier circuit is suitable for use with variable frequency AC supplies. Preferably each semiconductor bridge circuit comprises, for each individual one of the AC supply rails, a pair of semiconductor devices in series connection between the first and second DC rails with their associated AC supply rail being connected to the node formed by the interconnection between the pair of semiconductor devices.

Advantageously the at least one phase shifting device comprises a transformer. A three phase transformer having its secondary windings connected in a delta configuration is well known in the art for the generation of a 30° phase shift. However other transformer configurations, such as star or delta configurations in which components of other windings are added into a secondary winding current path, see for example the winding schemes proposed by Georges—Emile April and Guy Olivier, "A Novel Type of 12 Pulse Converter" IEEE Transactions on Industry Applications Vol. 1A–21, No. 1, 1985.

Preferably the connections from the AC supply to the phase shifting device and the first semiconductor bridge circuit are in series. This ensues that an equal current balance, or a predetermined current balance, can be forced in each bridge circuit.

In a preferred embodiment each of the primary windings of the or each transformer forming the or each phase shifting device is in series with a respective input of the first bridge circuit. However, in a further embodiment of the present invention the AC supply paths to at least two of the semiconductor bridges are in parallel.

The inventors have noted that by connecting the AC supplies to inputs to the semiconductor bridges in series, and by connecting the outputs of the semiconductor bridge circuits (which form three phase rectifier circuits) in series, but with a capacitor filter being connected across the series combination of the bridge circuits rather than solely across each individual bridge circuit then the instantaneous mismatch of output currents from the bridge circuits causes repetitive bypass paths to be formed through the diodes of the bridge circuits for the excess currents. This causes a voltage collapse on one bridge and a corresponding voltage on the other bridge (and vice versa) and results in individual bridge circuit output voltages that are repetitive waveforms, and in particular are signals in the form of unidirectional square waves at six times the supply frequency rather than constant voltage levels. The square waves are complimentary and sum to a constant direct voltage level across the series connected arrangement of bridge circuits, as seen at the capacitor filter. In embodiments where P semiconductor rectifier bridges are connected in series a square wave is developed across each bridge with a period of $$\frac{1}{p}.$$

In a first embodiment having only a first and second semiconductor bridge circuits the harmonic injector is interposed between the first and second semiconductor bridge circuits. Preferably the harmonic injector is a passive device that is responsive to the current mismatch produced between the semiconductor bridge circuits. In a preferred embodiment of a rectifier unit the harmonic injector comprises a transformer having a first winding herein known as the injection winding connected to one of the bridge circuits such that the transformer is responsive to the harmonic signal developed across the bridge circuit. A second winding herein known as the sensing winding of the injection transformer is connected to the AC terminals of a rectifier block, and the DC terminals of the rectifier block are connected between the first and second semiconductor bridges. Using this circuit arrangement, the turns ratio of the insertion transformer can be chosen to optimise the level of harmonic injection. In addition the normal AC and DC side voltage and current relationships are preserved such that the circuit components may be optimised and undesirable effects for example transformer saturation, are prevented. The deliberate injection of harmonic components having a selected harmonic order number and phase can be used to cancel or minimise other harmonic components which are inherently generated during the rectification process thereby reducing harmonic distortion of the current drawn by the rectifier.

In other embodiments of the invention, part of the harmonic injector may be connected between the "central node" formed between the filter capacitors and a node located between the semiconductor bridge circuits, whereas other components of the harmonic injector may be either in series with the semiconductor bridge circuits or in parallel with the series connected semiconductor bridge circuits.

According to a second aspect of the present invention there is provided a method of reducing total harmonic distortion arising from an AC to DC converter, the method comprising: providing first and second three phase passive rectifiers in series, with the second rectifier being supplied via a delta connected transformer and the first rectifier being supplied by connection to a star connected transformer or via series connection to the primary windings of the delta connected transformer, and wherein a common current path is provided through the first and second rectifiers such that instantaneous current conflicts cause the creation of "by-pass" current paths through one or other of the rectifiers giving rise to the generation of a waveform at six times the supply frequency which is used to drive an harmonic injector compensation circuit for injecting a harmonic waveform at a node between the first and second rectifiers.

BRIEF DESCRIPTION OF THE DRAWINGS

The present invention will further be described, by way of example, with reference to the accompanying drawings, in which:

FIGS. 8*a* to 8*f* show various waveforms relating to the operation of the circuit shown in FIG. 7;

DESCRIPTION OF PREFERRED EMBODIMENTS OF THE INVENTION

Figure 1:
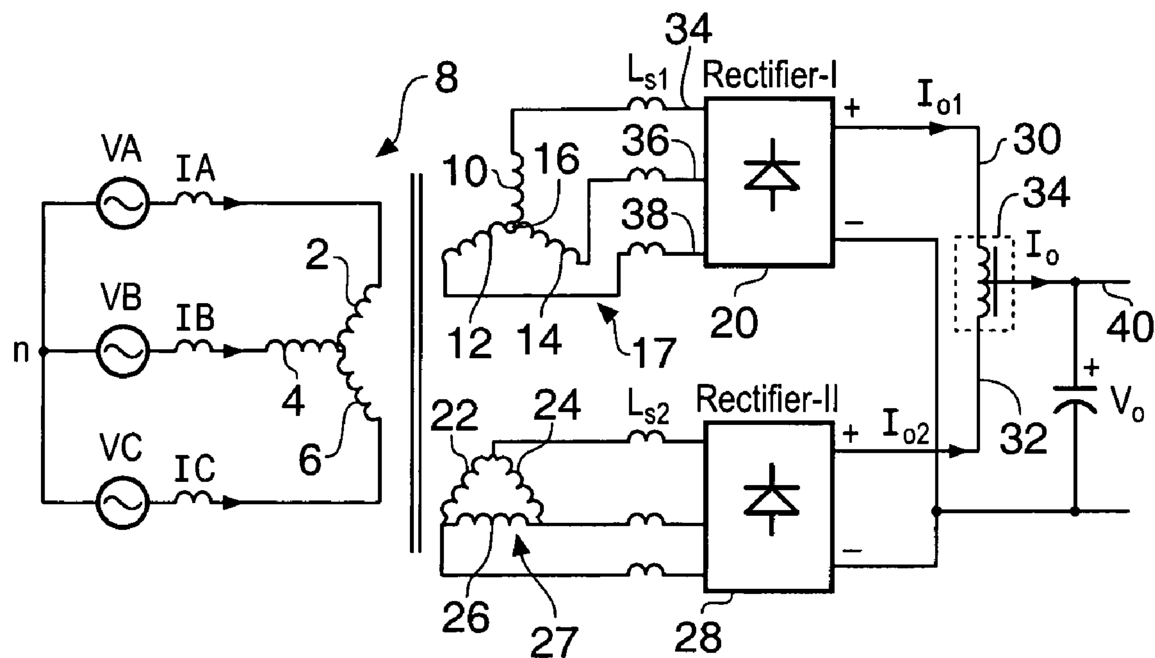
FIG. 1 schematically illustrates a twelve pulse transformer based multiphase rectifier of the type known in the prior art.
Figure 5:
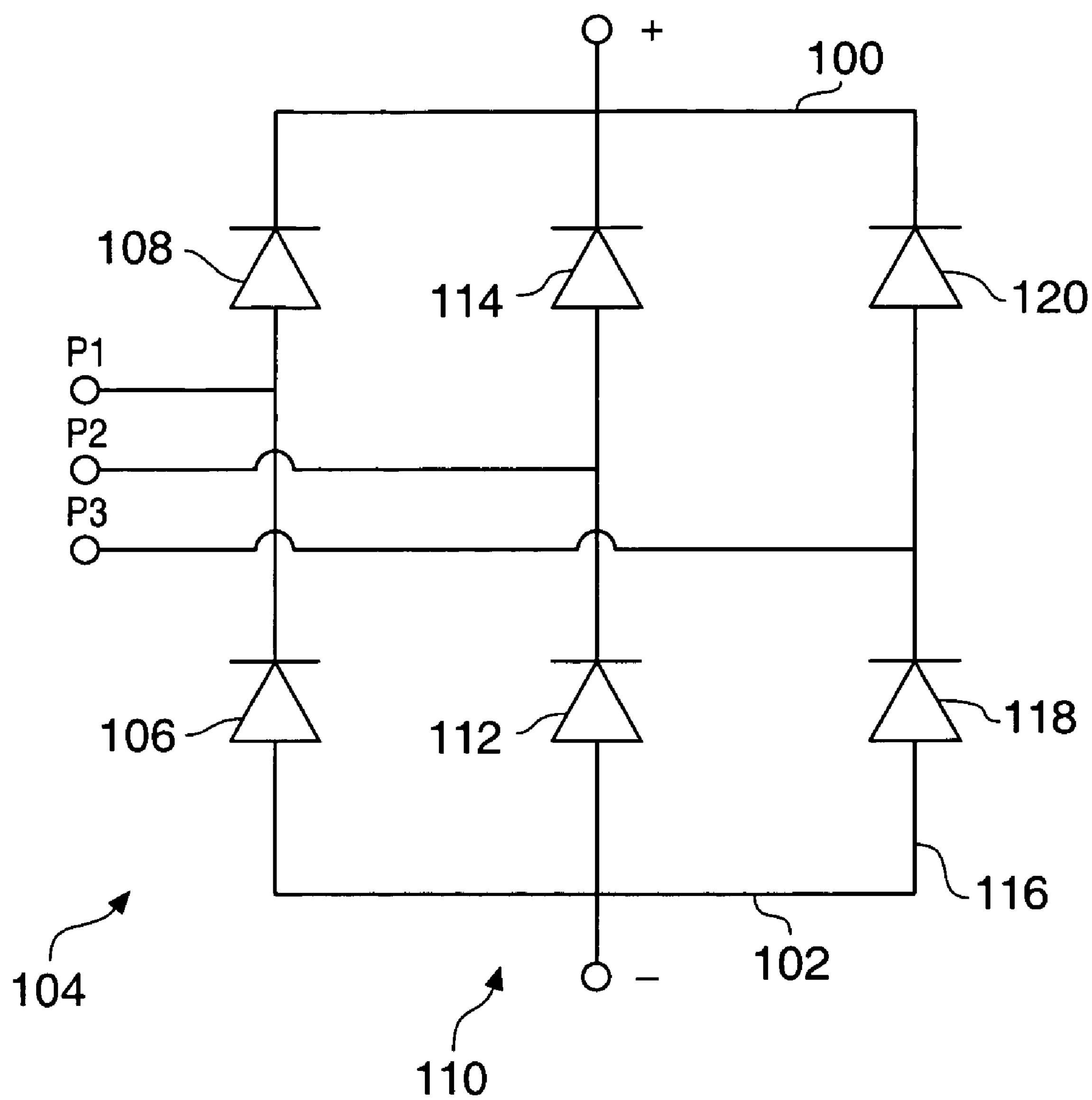
FIG. 5 illustrates a rectifier bridge in greater detail.

The arrangement shown in FIG. 1 is that of a prior art twelve pulse rectifier. A three phase supply comprising phase A having a voltage $V_A$ and a current $I_A$ and phases B and C similarly designated are supplied to star connected windings 2, 4 and 6 of a transformer generally designated 8. It is common for the phases to be referred to as "red", "yellow" and "blue", and designated by R, Y and B respectively where red is the zero phase, yellow is the 120° phase and blue is the 240° phase. Both conventions will be used here with A=red, B=yellow and C=blue. The transformer has two sets of secondary windings. A first set of windings 10, 12 and 14 are also connected in a star configuration, i.e. the windings are connected to a common node 16 and for simplicity may be referred to as a "star" windings 17. Outputs of the windings 10, 12 and 14 are supplied to a first rectifier assembly 20 which has the configuration shown in FIG. 5. A second set of windings 22, 24 and 26 are connected in the delta configuration and for simplicity may be referred to as "delta" windings 27. Outputs from the delta connected windings 27 are supplied to a second rectifier block 28 whose construction is the same as the rectifier block 20. It is well known that, and can also be shown by graphical analysis, that the delta configuration in which each winding forms the difference between two of the input phases, for example $V_A-V_B$, $V_B-V_C$, or $V_C-V_A$ results in the generation of further sinusoids 30° out of phase with the input sinusoids. In order to maintain the correct current and voltage relationship between the primary and secondary windings the relative turns ratio must be 1:1 for the star windings and $1:\sqrt{3}$ for the star-to-delta windings. The transformers can also be configured for step up or step down action.

The rectifier units 20 and 28 are connected in parallel and the positive output rails 30 and 32 are provided as inputs to an inter-phase reactor 34, which is required to ensure instantaneous current balance between the two rectifier units.

Whilst this arrangement works adequately to give harmonic cancellation of the 5th and 7th order harmonics the input transformer 8 has to be rated to carry the entirety of the power requirement of the load connected to the rectifier together with some suitable margin of safety. This impacts on the gauge of the transformer windings and the weight and size of the device in general.

Figure 2:
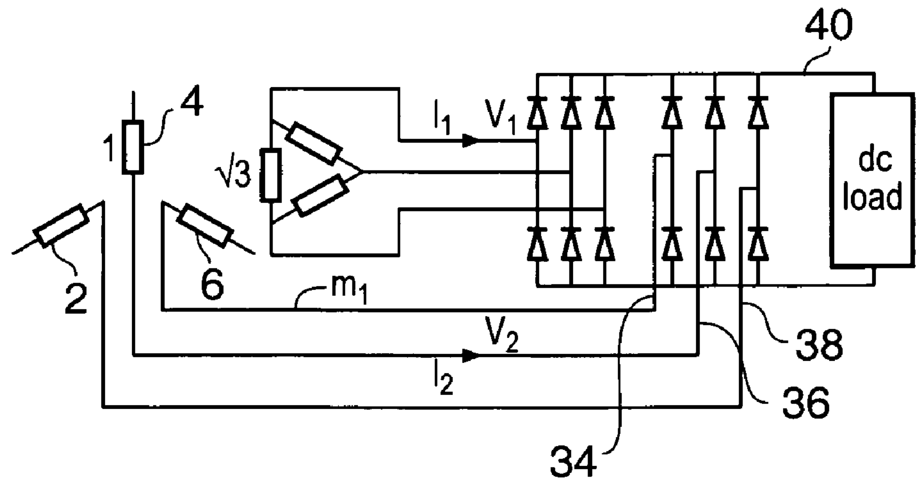
FIG. 2 schematically illustrates a further prior art twelve pulse rectifier wherein galvanic isolation has been dispensed with in order to eliminate one of the transformers compared to the arrangement shown in FIG. 1.

FIG. 2 shows a further prior art arrangement described by Derek A Paice in his book titled "Power Electronic Converter Harmonics—Multi-pulse Methods for Clean Power". This arrangement, taken from FIGS. 5–16 of the book shows that the arrangement shown in FIG. 1 can be simplified by dispensing with the star connected transformer and connecting the primary windings 2, 4 and 6 directly to respective inputs 34, 36 and 38 of the first rectifier block 20. This results in a reduction of the power handling requirements of the transformer 8 but simultaneously also results in the loss of galvanic isolation between the input supplies $V_A$, $V_B$ and $V_C$ and the DC output bus 40.

In each of these prior art arrangements the DC rectifier blocks are connected in parallel and the output of each is held at the DC output voltage of the rectifier by virtue of being coupled to a smoothing capacitor, for example as shown in FIG. 1.

The inventors have realised that the apparently minor reconfiguration of the circuit achieved by placing the outputs of the converter blocks in series whilst simultaneously placing their inputs effectively in series and removing individual voltage smoothing capacitors from around the blocks results in a radically different mode of operation, in which conflict between the bridges can be used to self generate a waveform for harmonic cancellation.

Figure 3:
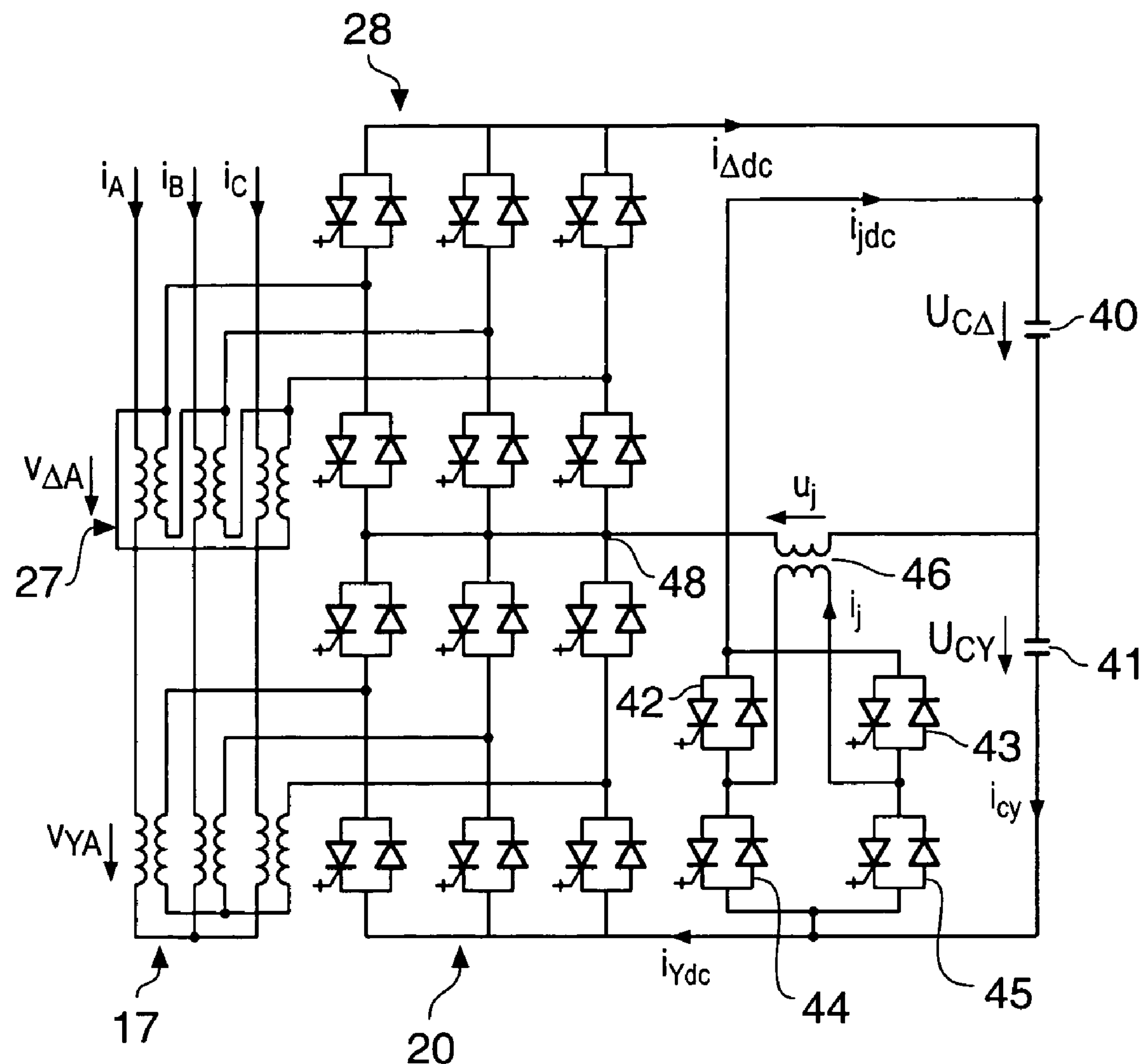
FIG. 3 shows a further prior art AC to DC converter.

The paper "A New High-Pulse Voltage Sourced Converter for HVdc Transmission" Y H Liu, J Arrillaga and N Watson, IEEE Transactions on Power Delivery Vol. 18, no. 4, October 2003, pages 1388–1393 discloses a re-injection converter as shown in FIG. 3. In order to simplify the discussion of the Figure like reference numerals will be used to refer to items which have already been described with respect to FIGS. 1 and 2. Thus star winding 17 is connected to a first rectifier block 20 and delta winding 27 is connected to a second rectifier block 28. The rectifier blocks 20 and 28 are arranged in series. The rectifier block 28 has capacitor 40 in parallel with it, whereas capacitor 41 is in parallel with the rectifier block 20. An "H" bridge composed of four silicon controlled rectifiers 42–45 (active switches) which are electronically controlled to be either conducting or non-conducting is connected between the DC output rails. Switches 42 and 44 are connected in series, as are switches 43 and 45. A common node for switches 42 and 43 is connected to the positive DC rail. A common node of the switches 44 and 45 is connected to negative DC rail. A primary winding of a transformer 46 is connected between the opposing sides of the H bridge. A secondary winding of the transformer is connected between a midpoint between the rectifiers 20 and 28, and a common node between the capacitors 40 and 41.

In use, the switches 42 to 45 are switched so as to derive a re-injection voltage $U_j$ which is imposed upon the node 48 between the rectifier bridges. The switches can be controlled either to:

a) short circuit the primary winding of the injection transformer;
b) connect the primary winding in a forward direction;
c) connect the primary winding in a reverse direction;

as set out in column 2 on page 1388 of the IEEE Journal.

Short circuiting the transformer primary requires the use of active devices, (in conjunction with commutation diodes) in order to ensure that switches 42 and 43, or switches 44 and 45 are simultaneously conducting in order to short circuit the transformer primary winding whilst avoiding shorting the DC rails together. This arrangement requires the provision of a controller to control the operation of each of the active switches and introduces a potentially damaging failure mode in which series connected switches could both be turned on or fail on, thereby shorting the DC output rails together. This circuit operates in a significantly different way to the present invention.

Figure 4:
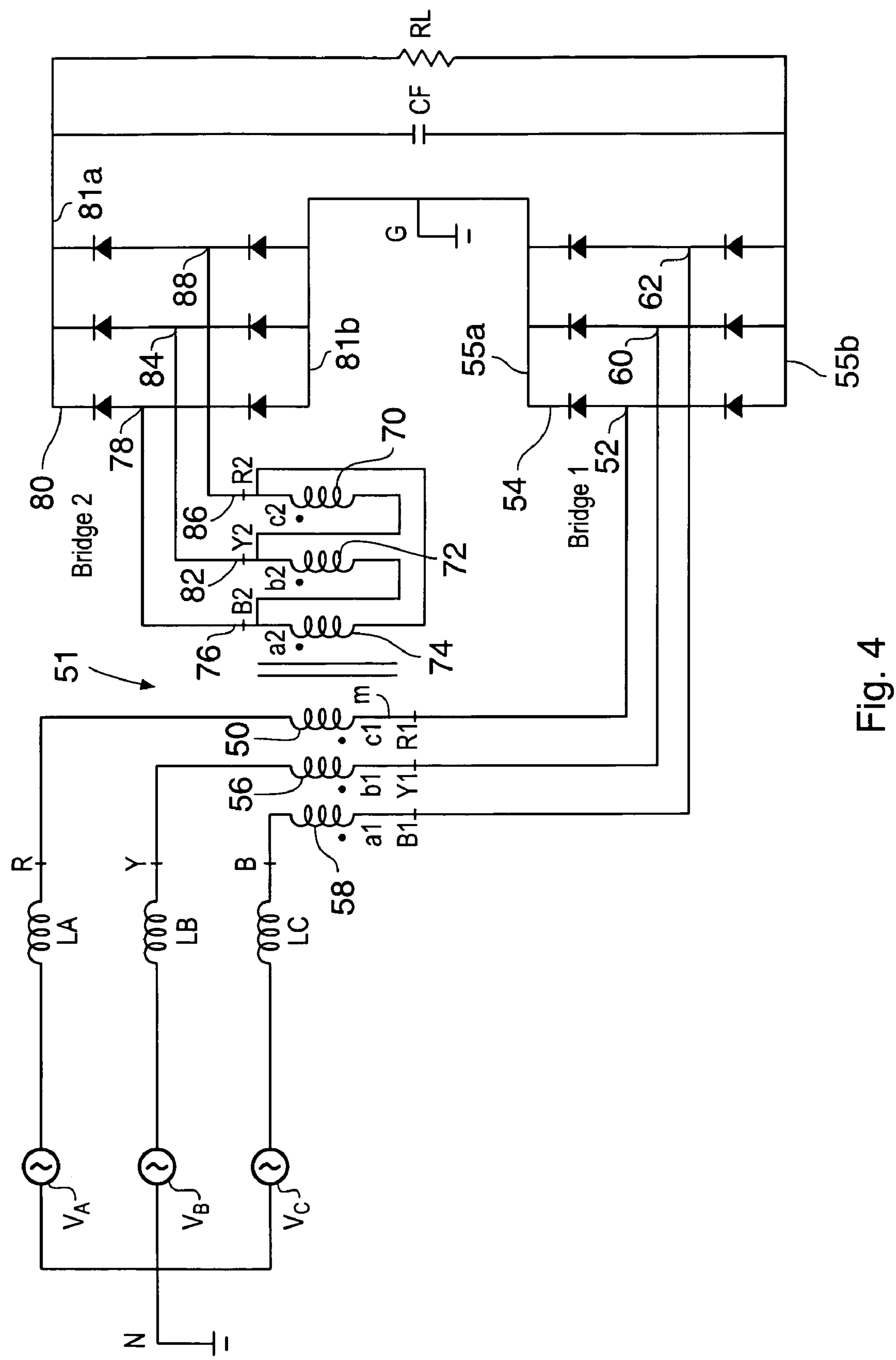
FIG. 4 schematically illustrates an AC to DC converter having series connected rectifier bridges.

FIG. 4 schematically illustrates an AC to DC converter whose operation will be considered so as to exemplify the generation of conflict between the bridges. As before, the three phase supply is schematically represented by voltage sources $V_A$, $V_B$ and $V_C$ which nominally have the same output voltage but which are displaced in phase with respect to one another by 120°. Voltage supply $V_A$ is connected by way of a first primary winding 50 of transformer 51 to a first input 52 of a first rectifier bridge generally designated 54 having first and second DC rails 55*a* and 55*b*. Similarly the voltage supplies $V_B$ and $V_C$ are connected by way of respective transformer primary windings 56 and 58 to input connections 60 and 62 of the bridge 54. Each supply $V_A$, $V_B$ and $V_C$ is shown as being in series with a respective inductor $L_A$, $L_B$ and $L_C$ which could be an individual component but which may be present simply as a result of self inductance of the conductors used to interconnect the three phase supply to the rectifier and/or the leakage inductance of the transformer 51. The winding 50 is magnetically coupled via transformer action with the corresponding secondary winding 70, primary winding 56 is magnetically coupled to corresponding secondary winding 72, and primary winding 58 is magnetically coupled to corresponding secondary winding 74, and the windings 70, 72 and 74 are connected such that each is in series with the others and a connection point is made at each node between the windings. Thus the windings 70, 72 and 74 are connected in a delta configuration. A connection is made from a first node 76 between windings 72 and 74 to a first input 78 of a second rectifier bridge circuit, generally indicated 80 having first and second DC rails 81*a* and 81*b*. A connection is made from a second node 82 between windings 70 and 72 to a second input 84 of the rectifier 80, and a connection is made from a third node 86 between windings 70 and 74 to a third input 88 of the second rectifier 80.

The windings 50, 56 and 58 are placed in series connection with the inputs 52, 60 and 62 of the first bridge 54 and this has the consequence that a predetermined relationship is established between the currents in the first and second rectifier bridges 54 and 80. By choosing a primary to secondary transformer ratio of $1/\sqrt{3}$ the rectifier bridges are fed with the same current amplitude, but the phase difference between them is 30°. Any instantaneous current imbalance results in a "conflict" which can only be resolved by the generation of "by-pass" paths within one or other of the bridges.

In order to appreciate the working of the present invention it is advantageous to consider the operation of each individual rectifier bridge in greater detail. The rectifier bridge is shown in greater detail in FIG. 5 and is of a 6 pulse design. The bridge comprises positive and negative rails 100 and 102, respectively. Interconnecting the rails 100 and 102 are three pairs of diode rectifiers. The diodes in each pair are in series configuration and each pair rectifies a respective phase of the multiphase supply. Thus the first diode pair 104 comprises diodes 106 and 108. The anode of diode 106 is connected to the negative rail 102 and the cathode of the diode 106 is connected both to an input terminal P1 for accepting a first input phase, but also to a anode of the second diode 108. The cathode of the second diode 108 is connected to the positive supply rail 100. A second diode pair 110, comprising diodes 112 and 114, is similarly connected, but this time to supply P2, and a third diode pair 116 comprising diodes 118 and 120 is similarly connected to supply P3.

For simplicity, we shall consider the sum of the currents flowing in diodes 108, 114 and 120 resulting from the positive half cycles of the supplies P1, P2 and P3. It will be appreciated that similar analysis can be done for the diodes 106, 112 and 118 during the negative half cycles P1, P2 and P3.

Figure 6:
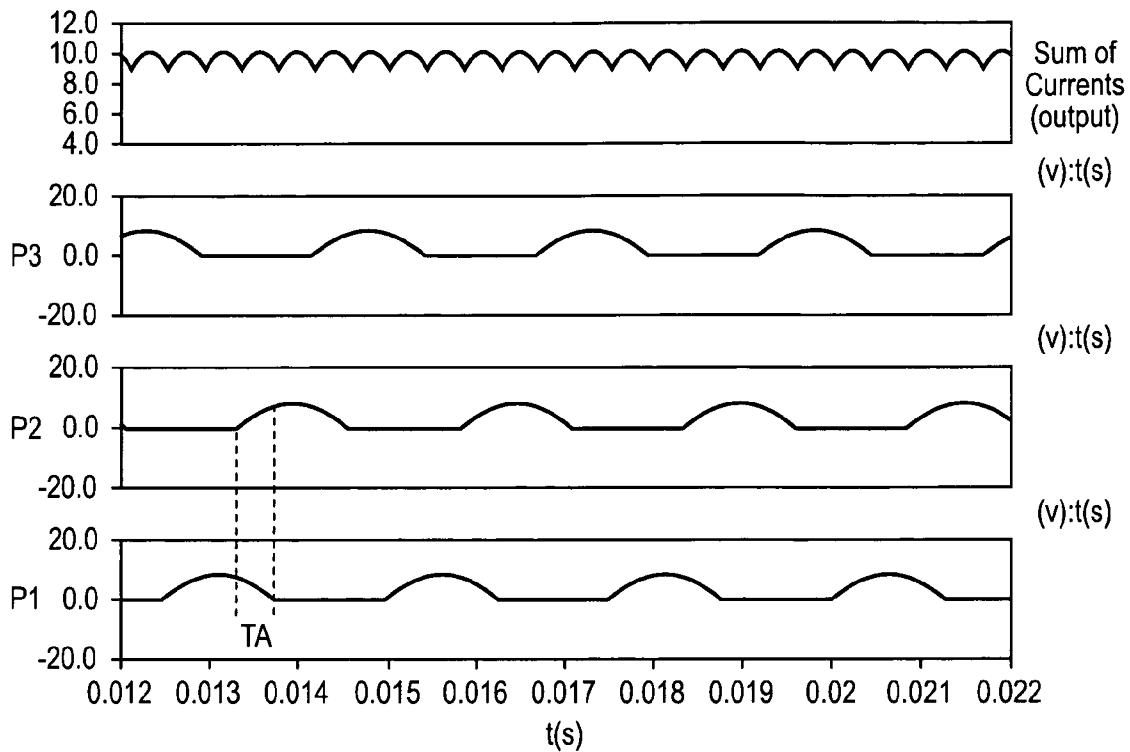
FIG. 6 illustrates the individual current contributions through the upper diodes in the rectifier bridge shown in FIG. 5 together with their sum.

FIG. 6 schematically illustrates the current flowing in diode 108 from supply P1, current flowing in diode 114 from supply P2 and current flowing in diode 120 from supply P3. It can be seen that the conduction period of diode 108 connected to supply P1 commences approximately 120° before the conduction period of diode 114 connected to supply P2, which in turn is 120° in advance of the conduction period of diode 120 connected to supply P3. When a diode is forward conducting the voltage drop across it falls to one diode drop, i.e. approximately 0.7 volts, and thus when two diodes are conducting simultaneously then to a first approximation their respective supplies are effectively connected together. Thus during the period TA shown in FIG. 6 when diodes 108 and 114 are both conducting supply P1 is effectively shorted to the positive supply rail 100, and supply P2 is also effectively shorted to the positive rail 100.

The total current flowing through the rectifier during the positive half cycles is the sum of the currents flowing through diodes 108, 114 and 120. Either numerical or graphical analysis shows that the sum of the currents can be considered as a DC value with a ripple current occurring at six times the fundamental frequency of the input supplies.

The above analysis holds true for the currents flowing in each of the bridges 54 and 80. That is each bridge rectifies the associated three phase supply to produce an output current of the type shown in FIG. 6 comprising a DC component with a ripple component where the ripple has a fundamental frequency of six times the input supply frequency. Thus the peaks in the ripple current are displaced at 60° intervals with respect to the input currents. However it will also be noted that the input currents to the bridges in FIG. 4 are displaced by 30° with respect to one another by virtue of the delta transformer action. Thus the peak ripple current in one bridge coincides with the minimum ripple current in the other bridge. Thus the instantaneous bridge currents resulting in their rectification action are generally different. However the bridges have been connected in series (both at their input side and their output side) and consequently the same current is forced to flow in each bridge.

Figure 7:
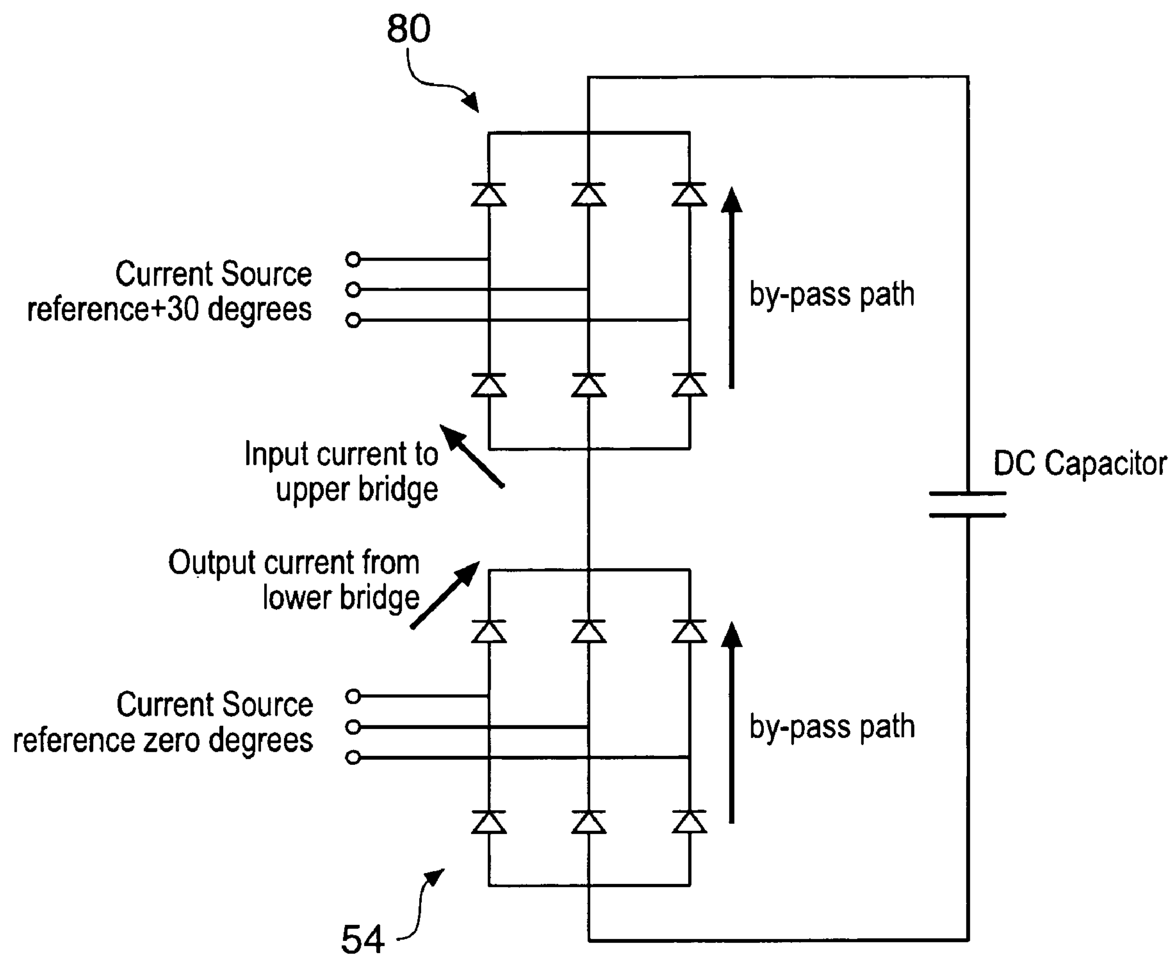
FIG. 7 schematically illustrates the current flow paths in a pair of series connected rectifier bridges of the type shown in FIG. 5.

Referring to FIG. 7, it can be seen that the output current from the lower bridge 54 flows as an input current to the upper bridge 80. Considering an instant in time in which the current provided by the lower bridge 54 is greater than the current provided by the top bridge 80, excess current forces its way through the upper bridge by opening up a bypass path through the serially connected diodes. The emergence of a bypass path causes one of the diode pairs to switch on. From this it follows that the voltage difference across the upper bridge assembly collapses to approximately zero. When a bypass path is opened all of the output voltage appears across the lower rectifier bridge assembly. However, due to the periodic nature of the ripple current the current originating from the upper diode bridge increases and that originating from the lower diode bridge decreases such that after 1/12 of a cycle of the AC input waveform the upper diode bridge now wishes to pass more current than the lower diode bridge and as a consequence the bypass path of the upper diode bridge closes and a bypass path in the lower rectifier block opens. Thus the voltage difference across the lower rectifier block collapses to substantially zero and substantially the entirety of the output voltage now appears across the upper rectifier block.

It can therefore be seen that each rectifier block has a square wave voltage appearing across it having a frequency which is six times the input frequency and a magnitude which is the entirety of the output voltage (the voltage drop across a diode to turn it on will be ignored as it is insignificant). The square waves occurring across the upper and lower rectifier bridges are in anti-phase and automatically passively synchronise with the input frequency.

FIG. 8*a* shows the current $I_1$ which results from rectification of the AC input current to the first (or lower) rectifier block 54, whereas FIG. 8*b* shows the current $I_2$ which results from the rectification of the AC input currents to the second (or upper) rectifier block 80. FIG. 8*c* shows the sum of these currents as a function of time. FIGS. 8*d* and 8*e* show the by-pass current (i.e. the current difference between $I_1$ and $I_2$) in the lower and upper rectifier blocks 54 and 80, respectively. FIG. 8*f* shows the voltage $V_{O1}$ developed across the first (lower) rectifier block 54.

The described current mismatches can be utilised to control the generation of harmonic components that are to be injected into the system in order to cause destructive harmonic interference and thereby reduce the total harmonic distortion in the current waveforms drawn from the three phase generator. For many applications adequate harmonic compensation can be achieved through the use of passive components acting on the current mismatch, thereby providing a relatively inexpensive and yet reliable system.

Figure 9:
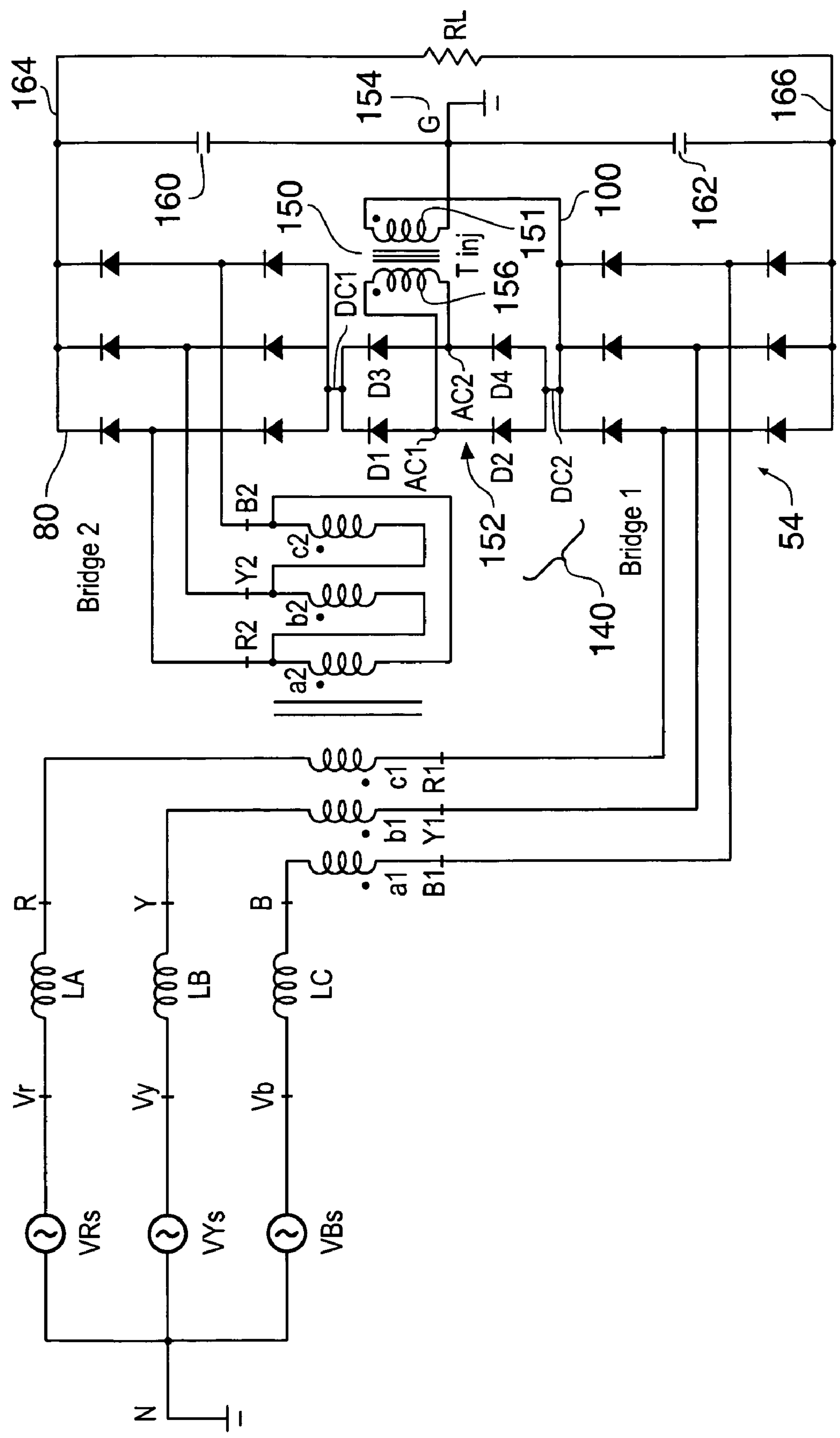
FIG. 9 schematically illustrates a rectifier constituting an embodiment of the present invention.

FIG. 9 schematically illustrates a rectifier constituting an embodiment of the present invention wherein a harmonic injector circuit, generally designated 140, comprising a harmonic injection transformer 150 and an associated diode bridge 152 is interposed between the first rectifier bridge 54 and the second rectifier bridge 80. The diode bridge 152 comprises four diodes D1 to D4 arranged to form a full wave rectifier. The diodes D1 and D2 are in series, as are D3 and D4. The anodes of diodes D2 and D4 are connected together forming a first DC terminal DC1. Similarly the cathodes of diodes D1 and D3 are connected together, forming a second DC terminal DC2. A first AC terminal, AC1, is defined by the node between diodes D1 and D2, whereas a second AC terminal, AC2, is defined by the node between diodes D3 and D4. An injection winding 151 of the injection transformer 150 is connected between the positive supply rail 100 of the first rectifier bridge 54 and a virtual ground 154. The virtual ground 154 is formed by first and second series connected capacitors 160 and 162 connected between DC output rails 164 and 166. The capacitors provide a high impedance to the DC voltage but a low impedance path to the AC mismatch current that flows in the injection winding 151. It has been noted in this circuit there is an instantaneous mismatch of the output currents from each bridge which causes repetitive bypass paths to be formed and each bridge output voltage is an unidirectional square wave at 6 times the supply frequency. The harmonic injector circuit is used to provide the mismatch in bridge currents at carefully chosen periods of time. This is controlled by the injection transformer turns ratio and gives a simple and automatically scaled control mechanism which is used to alter the formation of the bridge bypass paths. This has the desirable effect of altering both the unidirectional square-wave bridge output voltages and corresponding AC side converter terminal voltages such that the harmonic components of voltage and current are minimised.

The sensing winding 156 carries an alternating current waveform with a peak value equal to the DC load current, however the corresponding voltage across winding 156 is very low by virtue of the required turns ratio and gives a resultant transformer VA rating that is very low compared to the throughput power of the overall rectifier system.

Figure 10:
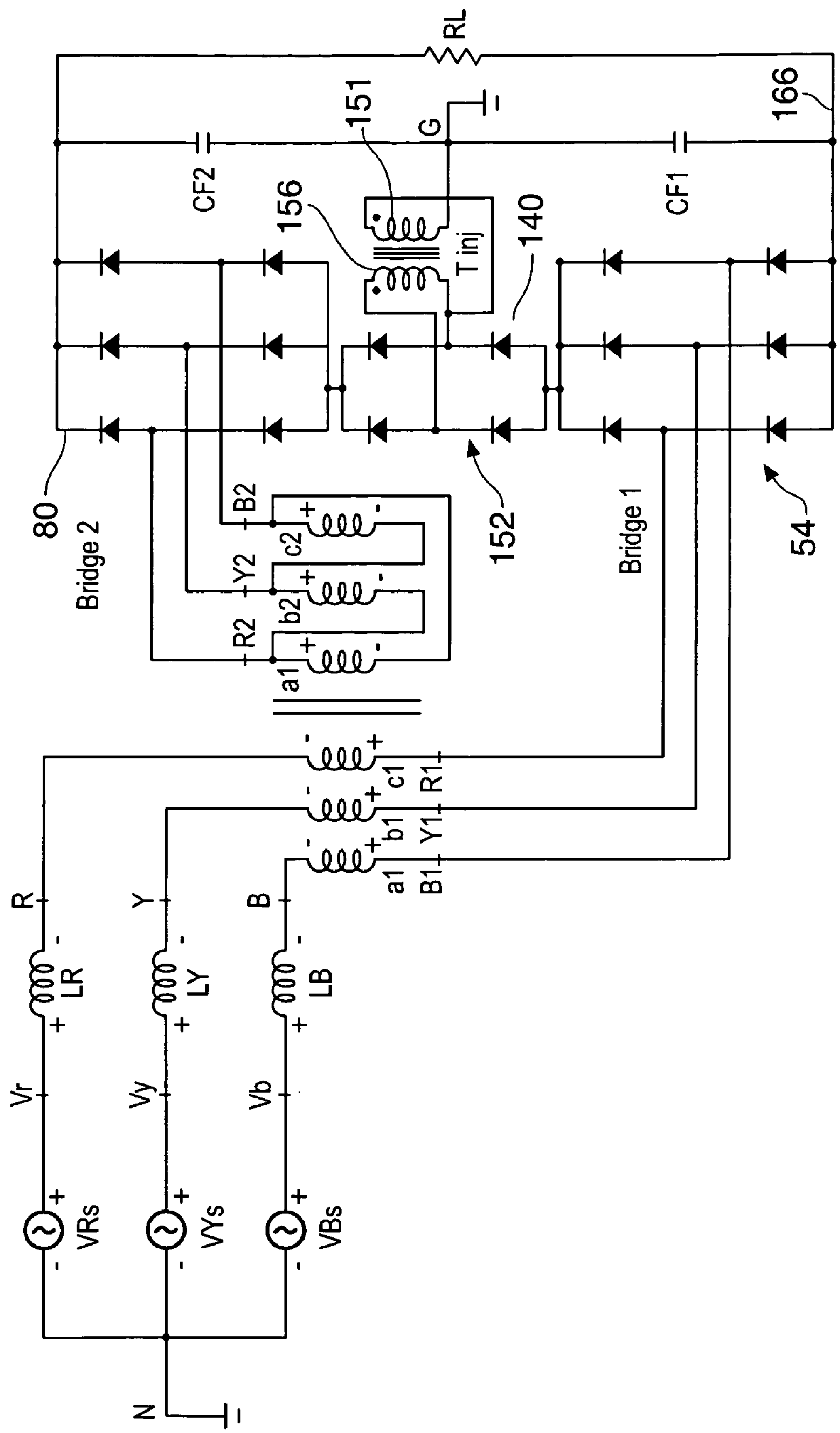
FIG. 10 schematically illustrates a rectifier constituting a further embodiment of the present invention.

FIG. 10 shows an alternative embodiment of the invention where the primary winding is now connected to one of the AC terminals of the injection diode bridge 152 rather than to the positive rail of the first bridge 54. Otherwise the mode of operation remains essentially unchanged. However the circuit shown in FIG. 10 gives output waveforms with better symmetry and hence represents an improvement over the circuit shown in FIG. 9.

Other possible connections exist, for example the injection winding may be connected to the negative rail. Thus the "direction" of the injection winding with respect to the sensing winding may be reversed. Additionally, compared to FIG. 10, the direction of both the injection and sensing windings may be reversed. The connection to the injection winding can be made to either the positive rail of semiconductor bridge 54 or to the negative rail of semiconductor bridge 80. These alternative possible arrangements can be implemented singly or in combination.

Figure 11:
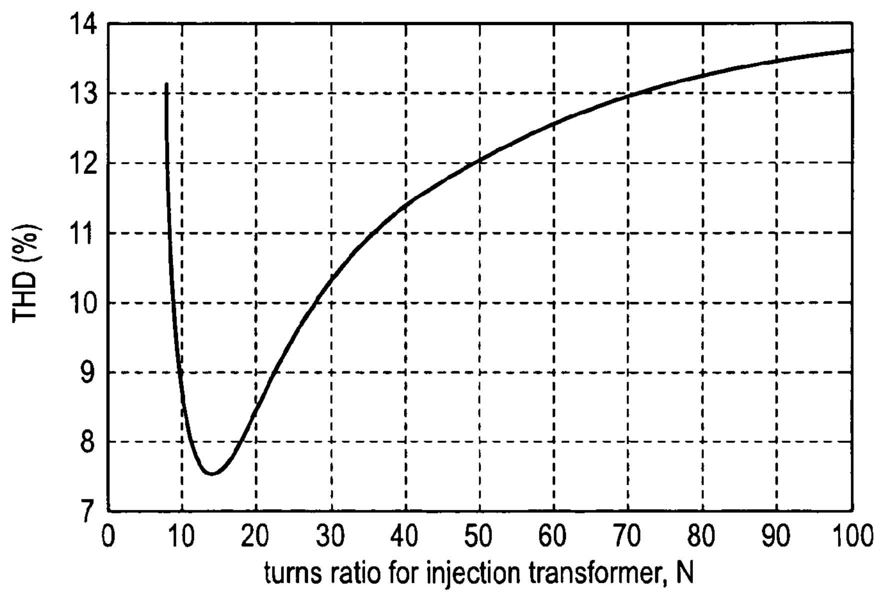
FIG. 11 is a plot of total harmonic distortion versus turns ratio of the injection transformer in FIG. 9.

FIG. 11 shows a graph of the total harmonic distortion of the AC terminal voltage of the converter (shown at points R, Y, B of FIG. 10) as a function of the injection transformer turns ratio N. It can be seen that a minimum total harmonic distortion occurs with a turns ratio of approximately 14, although it can also be seen that the circuit is relatively insensitive to small variations from this value. In this context the turns of ratio $$N = 14 = \frac{V_{inj}}{V_s}.$$

The input current total harmonic distortion also depends on the value of the input inductors interposed between the idealised voltage generators and the windings 50, 56 and 58.

It will be appreciated that the closer the voltages and currents drawn from the supply approximate a single sinusoid then the better the performance of the supply will be with regard to harmonic distortion.

It is worth comparing the voltage and current waveforms of the circuit shown in FIG. 9 with those of the circuit shown in FIG. 4.

Figure 12A:
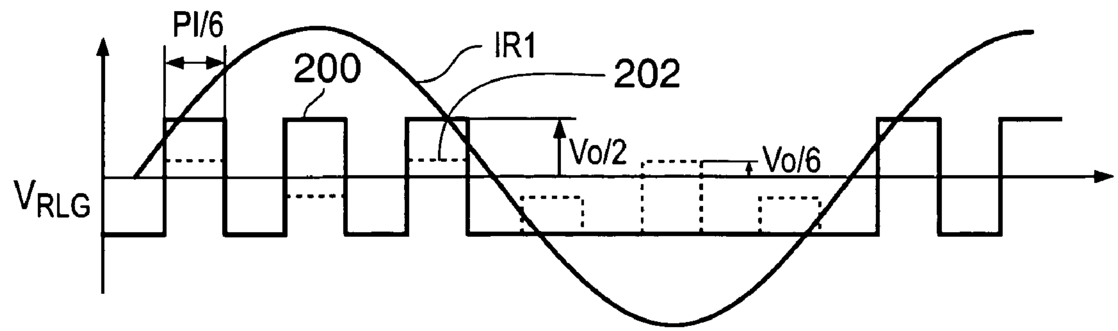
FIGS. 12*a* to 12*d* show voltage waveforms at various points within the circuit shown in FIG. 4.
Figure 12B:
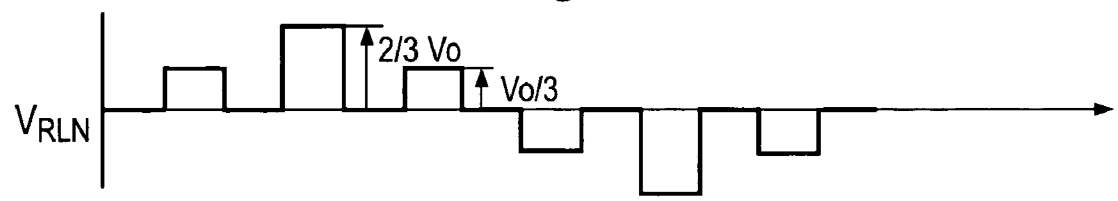
Figure 12C:
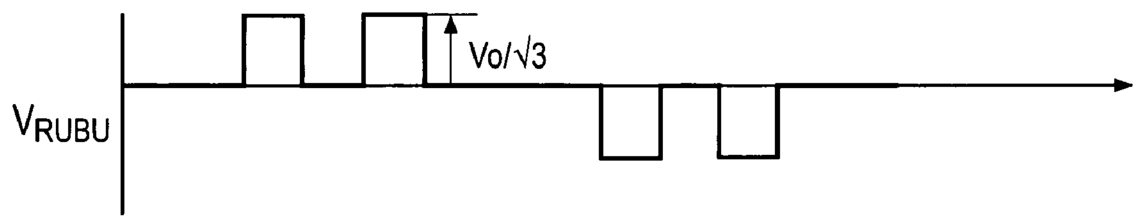
Figure 12D:
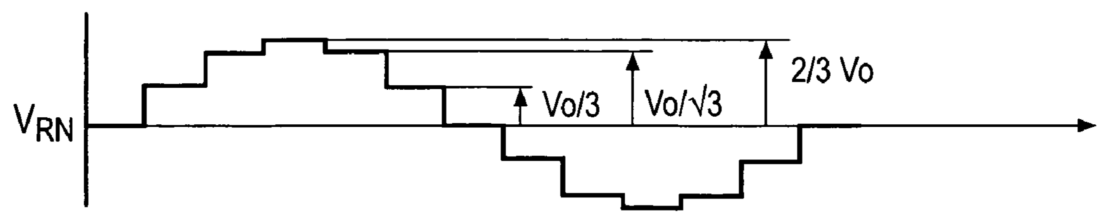

FIG. 12*a* shows the voltage waveform $V_{RLG}$ between point $R_1$ and virtual ground 154 in the circuit of FIG. 9. As used herein the rectifier 54 may be referred to as the first rectifier or the lower rectifier and waveforms associated with it may include the subscript "1" or "L". Similarly the rectifier 80 may be referred to as the second or upper rectifier and waveforms associated with it may include the subscript "2" or "U". A square wave shape as indicated by waveform 200 with peak values of $\pm v_o/2$ where $V_O$ is the rectifier output voltage. In order to refer the point $R_1$ to the neutral point N, zero sequence components 202 which mathematically can be shown to be the average of the red phase voltage $V_{RLG}$ and equivalent voltages on the yellow and blue phases i.e.

$$\frac{V_{RLG} + V_{YLG} + V_{BLG}}{3}$$

need to be subtracted from $V_{RLG}$, to give $V_{RLN}$ as shown in FIG. 12*b*. We then need to add the voltage reflected across the transformer 51 resulting from the voltage difference between nodes 76 and 86 in FIG. 4, and as shown in FIG. 12*c*. The sum of these contributions gives a step wise approximation between measuring point R and neutral as shown in FIG. 12*d*.

Figure 13A:
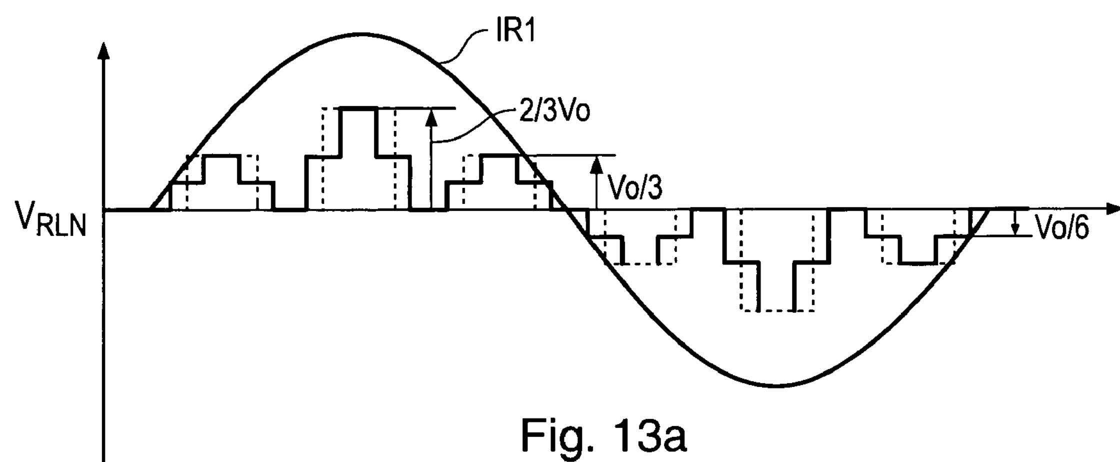
FIGS. 13*a* to 13*c* shows the improvement in equivalent waveforms with the embodiment of the present invention illustrated in FIG. 9.
Figure 13B:
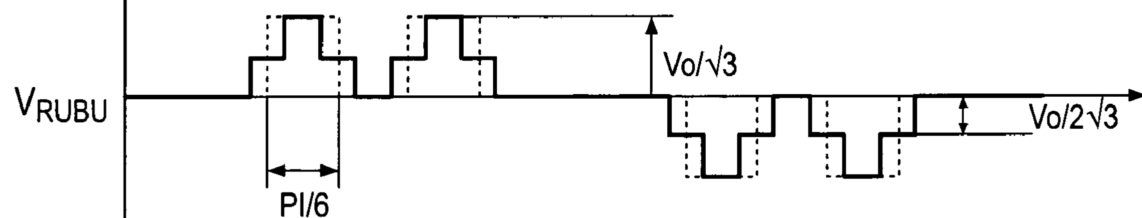
Figure 13C:
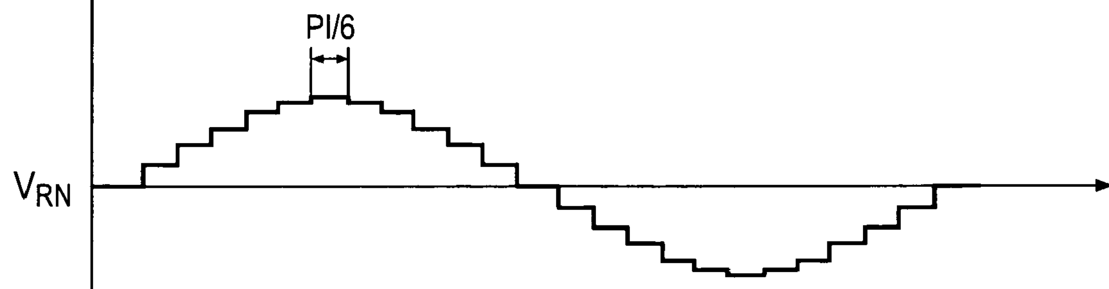

However, in the circuit shown in FIG. 9 the action of the harmonic injection circuit is to modify $V_{RLN}$ as shown in FIG. 13*a*. Similarly the voltage reflected back across the transformer 51 is also modified by as shown in FIG. 13*b* to give a voltage $V_{RN}$ in FIG. 13*c* is a 24 pulse stepped waveform which is a much better approximation to a sinusoid than the 12 pulse prior art voltage shown in FIG. 12*d*.

Figure 14:
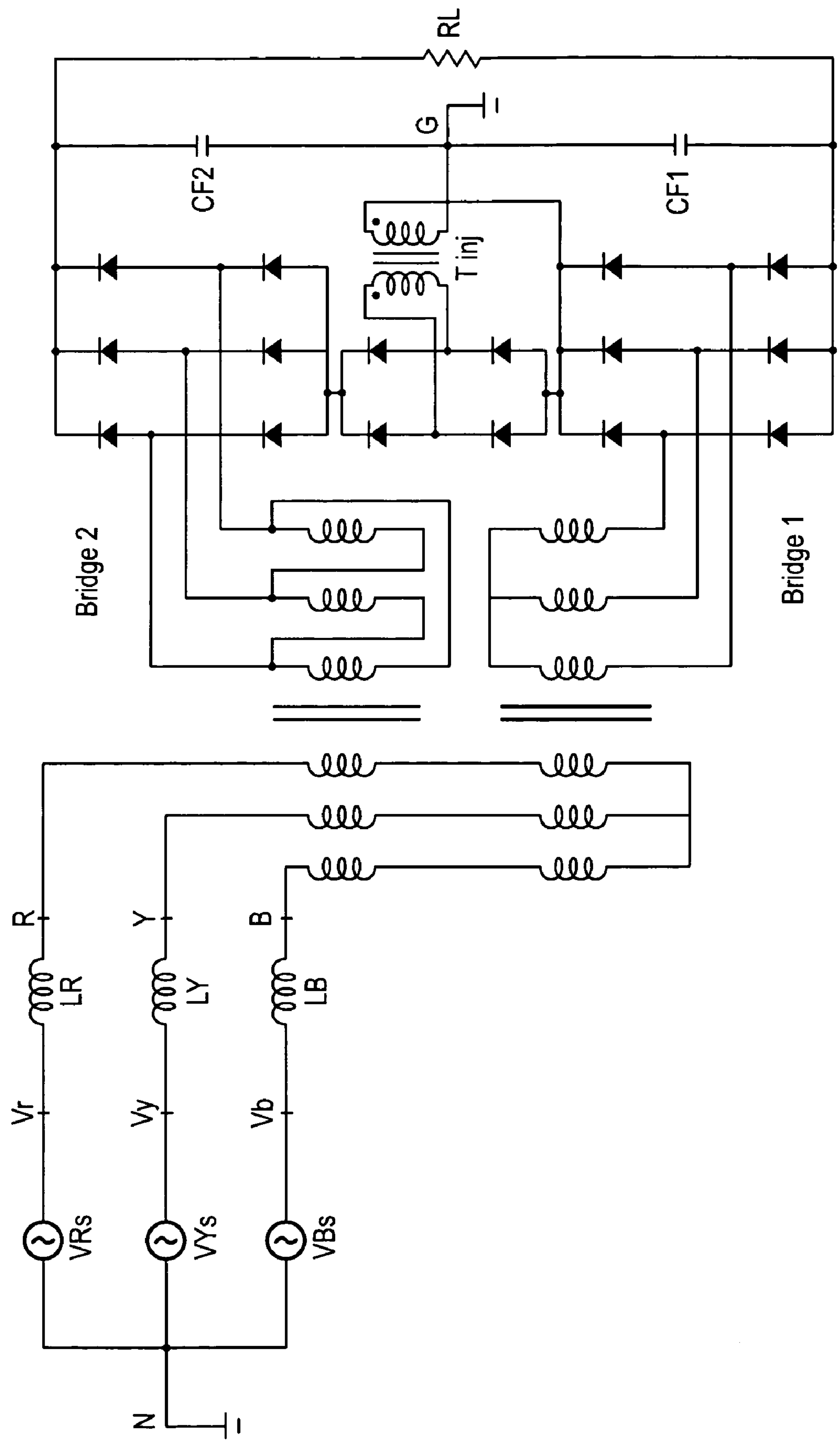
FIG. 14 shows a further embodiment of the present invention.

FIG. 14 shows a variation of the circuit of FIG. 9 whereby two transformers are used. The circuit operates in an identical manner but enables the DC output voltage to be varied and also provides galvanic isolation.

Figure 15:
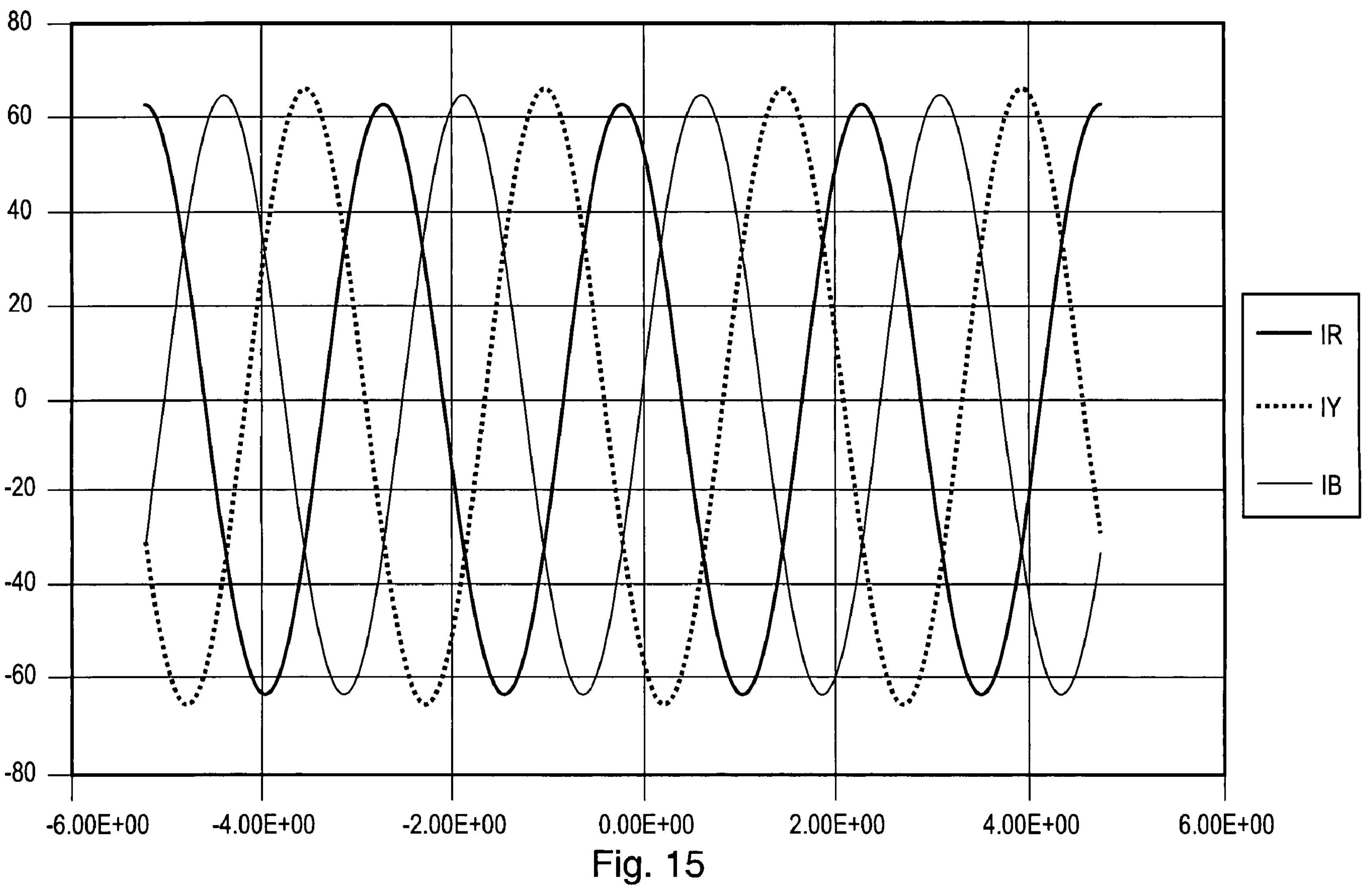
FIG. 15 shows a current waveform for the circuit of FIG. 9.
Figure 16:
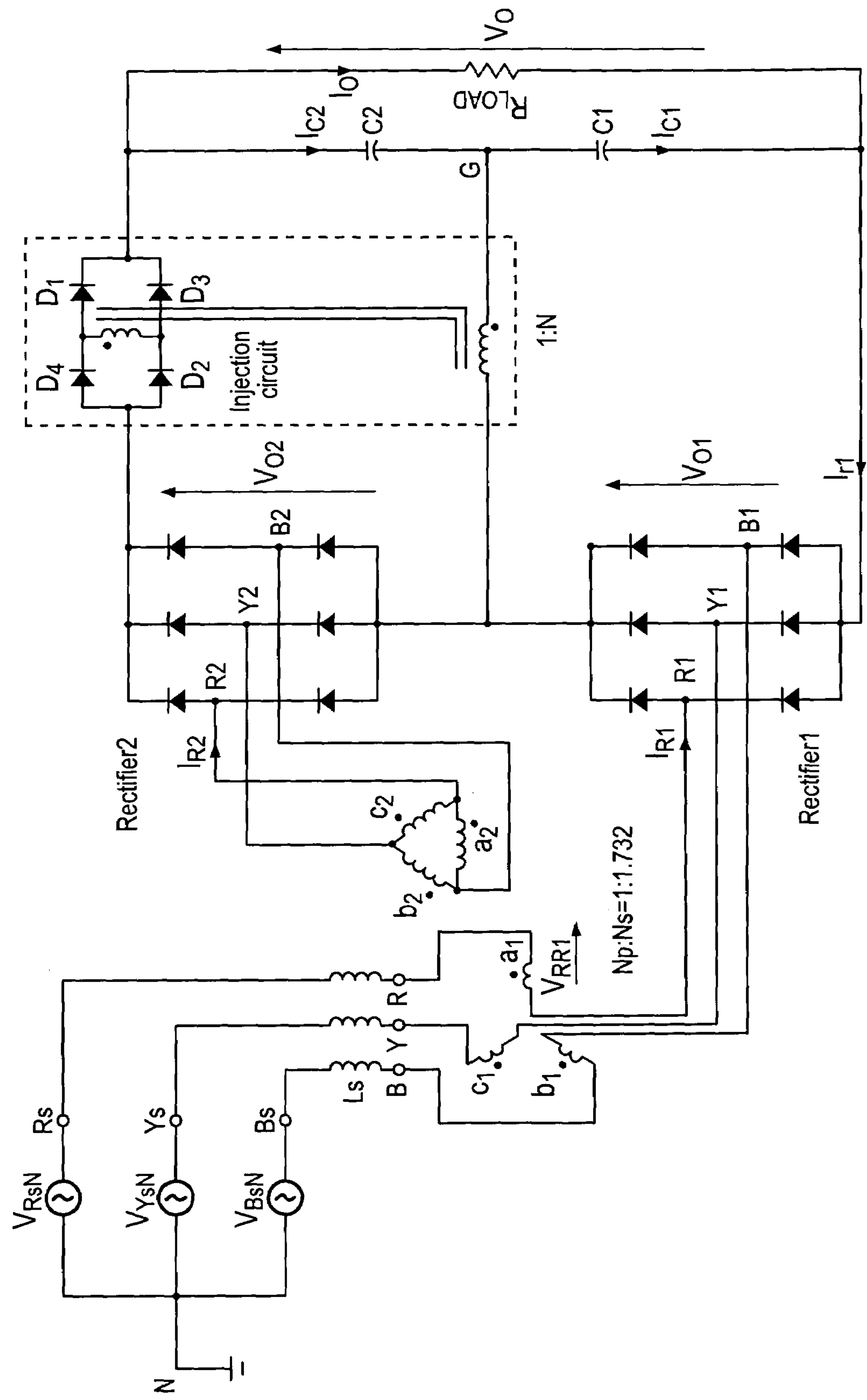
FIG. 16 shows a further embodiment of the present invention in which part of the harmonic injection circuit has been placed in the DC output rail of the converter.

A 15 kW prototype has been built and tested by the applicant using either the inherent transformer leakage inductance and the input inductors or additional external inductors having a value of 100 μH to represent the source and cable inductance of a typical installation. Under both circumstances the total harmonic distortion obtained remained below 2%. FIG. 15 shows the three phase current waveforms drawn by the rectifier from the three phase generator using the circuit shown in FIG. 9 and loaded to 15 kW. Furthermore during the test the injection transformer was confirmed to have a power rating of 2% of the main converter rating. Furthermore, since the injector transformer operates at six time the fundamental frequency it has the characteristics of a high frequency magnetic component and hence the reduced physical size.

In each of the preceding embodiments harmonic cancellation has occurred by virtue of injecting current between the rectifier bridges. The current injection circuit can also be implemented in different ways. In the configuration represented in FIG. 16, the sensing winding 156 winding and its associated diode bridge have been moved from the midpoint of the rectifiers (semiconductor bridges) 54 and 80 to the positive terminal or positive rail. It could have equally been placed in the negative terminal/rail. The optimum turns ratio N for the arrangement shown is in the region of 14.

The sensing winding could also be spread into several windings and distributed across the circuit, i.e. a second diode bridge and winding are inserted in the negative rail, with the polarity of the diodes reversed to give mirror injection circuits. The optimum turns ratio for this circuit is in the region of 28.

Another possibility could also involve connecting the primary winding (which can also be thought of as an injection winding to the secondary or sensing winding using a tap in the sensing winding.

Figure 17:
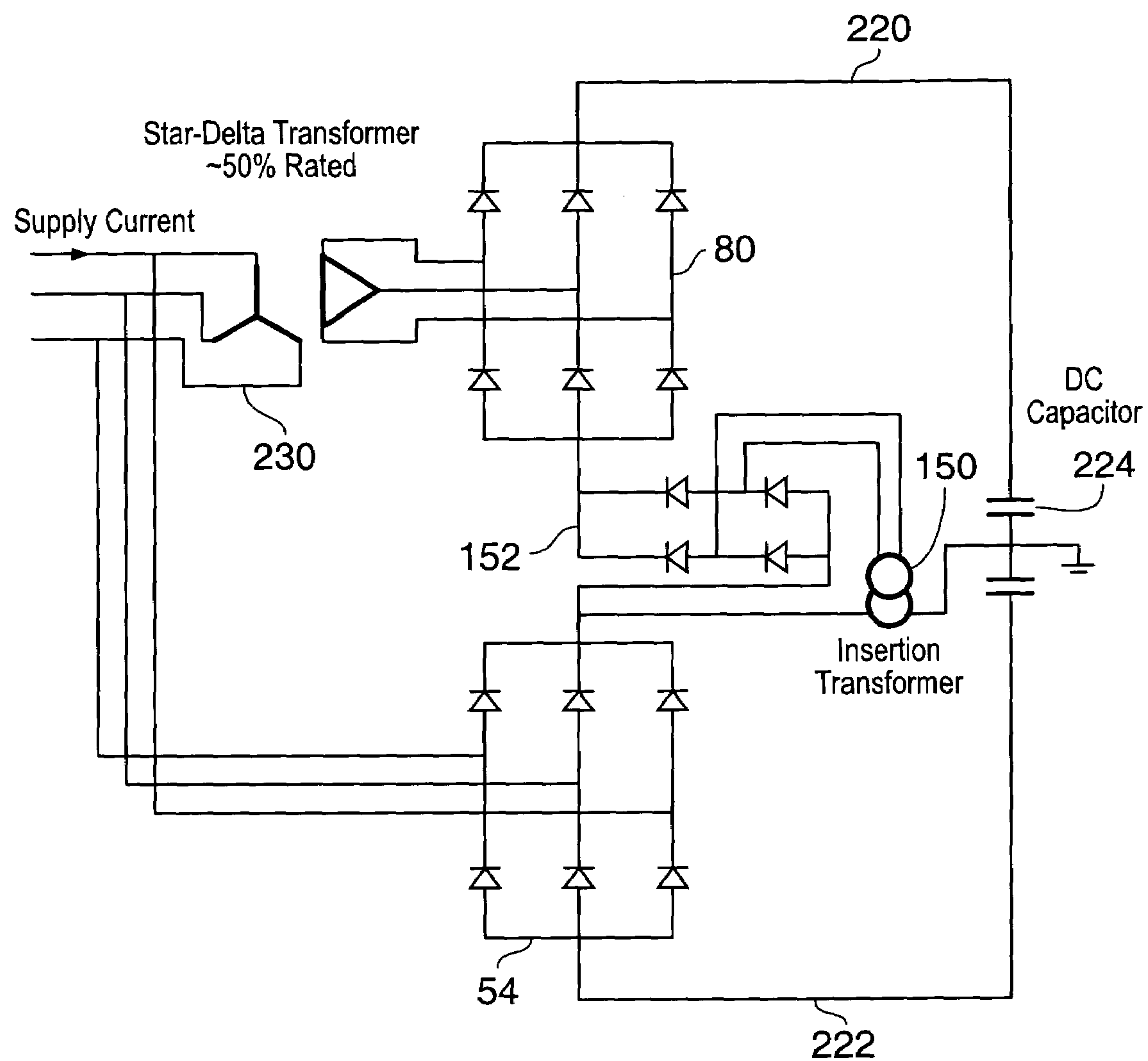
FIG. 17 shows a further embodiment of the present invention in which the AC inputs are in parallel.

FIG. 17 shows a further embodiment of the present invention in which, as with the embodiments shown in FIGS. 9 and 10 a harmonic injection transformer 150 and its associated rectifier bridge 152 is disposed in series connection in between a first rectifier bridge 54 and the second rectifier bridge 80. A DC output from the rectifier is developed across rails 220 and 222 and smoothed by a split storage capacitor arrangement 224 in which a capacitor is centre tapped to ground. The first bridge 54 has its AC input terminals connected directly to the polyphase AC supply. The phase shifter in the form of a star delta transformer 230 also has its primary windings connected to the polyphase AC supply. Thus, the input sides of the semiconductor bridges 54 and 80 are connected in parallel whereas the bridges themselves are connected in series. However, unlike the earlier embodiments, a squarewave voltage waveform is not developed across the bridges because current balancing can occur by virtue of the parallel connected input arrangements. Thus each bridge develops a DC voltage across it upon which is superimposed a ripple at six times the fundamental frequency. The ripple current as seen by the injection transformer 150 is transformed and re-injected back via the diode bridge 152 thereby generating ripples at twelve times the input frequency such that these can engage in harmonic cancellation. The magnitude of the ripple occurring across the semiconductor bridge 54 is much less than the magnitude of the equivalent square wave in the earlier embodiments of the invention and hence the transformer ratio needs to be modified. Initial work suggests that the transformer ratio should have a one to two times step up ratio with initial indications indicating that a step up ratio of about 1.5 gives adequate results.

Figure 18:
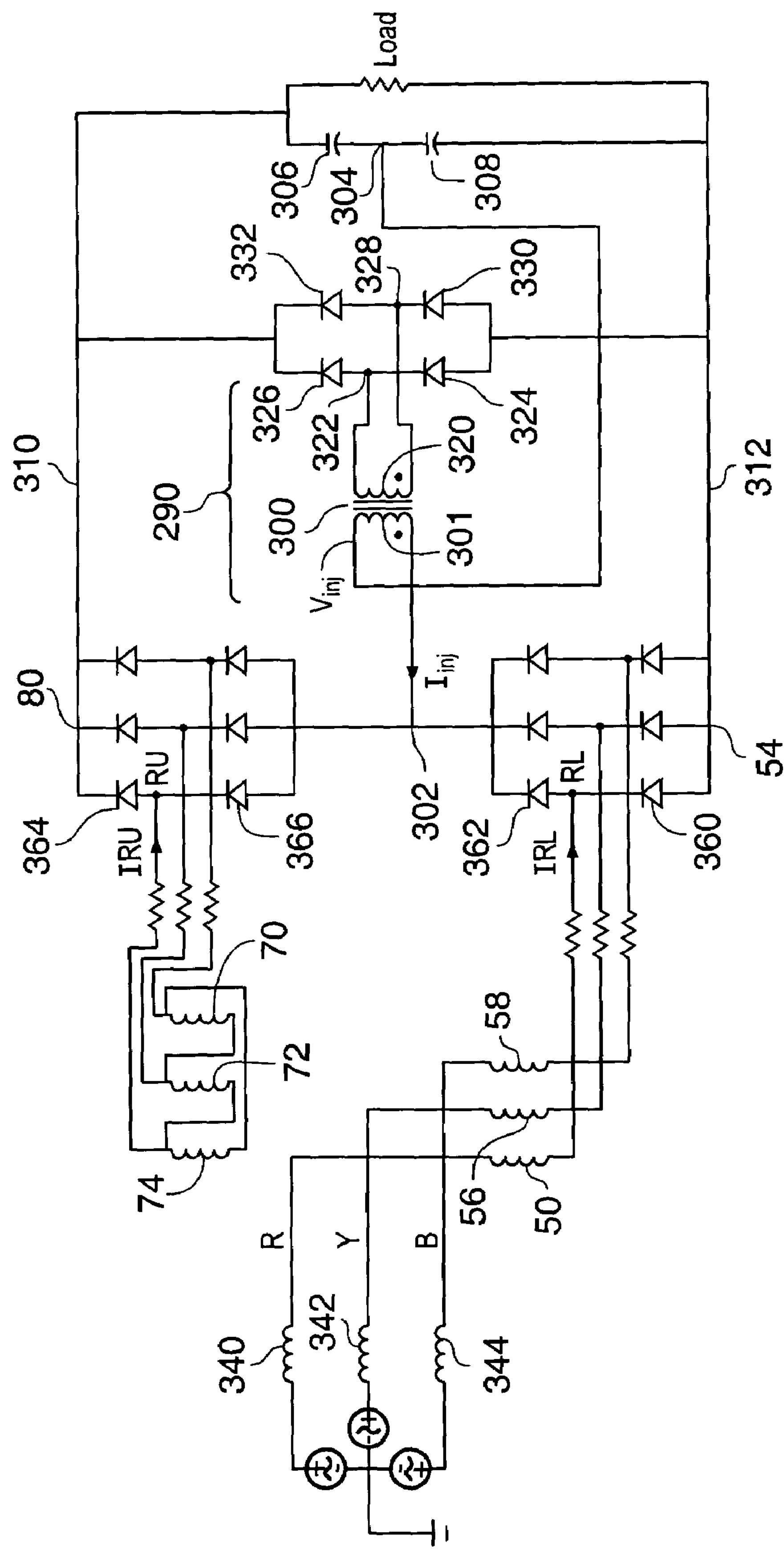
FIG. 18 shows a further embodiment of the present invention.

FIG. 18 shows a further embodiment of the present invention. This is similar to the arrangement shown in FIG. 4 and hence a current mismatch occurs between the rectifier bridges 54 and 80 that gives rise to the generation of a substantially square wave voltage at six times the input frequency. A harmonic injector, generally designated 290 comprises a transformer in combination with a full wave rectifier. The transformer 300 is connected such that one end of its primary or injection winding 301 is connected to a node 302 directly between the rectifier bridges 54 and 80. The other end of the injection winding is connected to a node 304 between a pair of capacitors 306 and 308 which are connected between a positive DC rail 310 and a negative DC rail 312.

A secondary or sensing winding 320 has a first connection made to a node 322 between a pair of series connected rectifiers 324 and 326. A second connection is made to a node 328 between series connected rectifiers 330 and 332. The rectifiers are diodes. The cathodes of diodes 326 and 332 are connected to the positive rail 310 and the anodes of diodes 324 and 330 are connected to the negative rail 312. Typically the transformer 300 is rated to about 2% of the power throughput.

In the earlier examples of the invention the current conflict in the rectifier bridges gave rise to a square wave voltage being developed across the bridges. In this embodiment the same process is still at work, and the current mismatch between the series connected rectifiers causes a current flow through the injection winding of the transformer to the node between the capacitors 306 and 308 which serve to block a DC current path but to permit an AC flow.

The transformer action couples the current flow across to the diodes 324, 326, 330 and 332. Each diode can only be either non-conducting or conducting. When a diode is conducting the voltage drop across it is close to zero volts. Consequently the secondary transformer can be thought of being connected to the DC supply either in one direction when for example diodes 326 and 330 conduct or in the other direction when diodes 324 and 332 conduct.

The transformer action from the transformer 300 causes a voltage change to be imposed on the node 302 and this in turn is imparted onto the AC supply via the windings 70, 72, 74 and 50, 56 and 58 of the supply transformer. Thus a square wave voltage $V_{inj}$, at six times the supply frequency is injected between the midpoint of the rectifier (e.g. node 302) and the midpoint of the output filtering capacitors.

The injection of this voltage creates complementary stepped waveforms at the output of the main rectifiers, which are implemented as semiconductor bridges, 54 and 80 which result in 24-pulse shaped waveforms at the right hand side of the input inductors 340, 342 and 344 (i.e. the side remote from the AC generator).

The injected voltage is added to the output voltage of the upper rectifier bridge 80, and subtracted from the output voltage of the lower rectifier bridge 54. Therefore the output voltages of the main rectifiers are given by:

$$V_{O1}=V_O/2+V_{inj} \quad (1)$$

$$V_{O2}=V_O/2-V_{inj} \quad (2)$$

where $V_{O1}$ is the voltage across the lower rectifier bridge 54 and $V_{O2}$ is the voltage across the upper rectifier bridge 80.

When the output current provided by the lower rectifier bridge 54 is greater than the output current provided by the upper rectifier bridge 80, the imposed injection current $I_{inj}$ is negative. Due to the amp-turns balance in the transformer, a negative current will flow in the sensing winding 320 which will bring diodes 332 and 324 into conduction. Consequently, a voltage of $V_O$ will be imposed across the sensing winding, and will be reflected to the injection winding as $$\frac{V_0}{N},$$

where N is the injection transformer turns ratio $$N = \frac{N_s}{N_i}$$

where Ns is the number of turns in the sensing winding and Ni is the number of turns in the injection winding. Therefore the output voltages across the main rectifier blocks will become:

$$V_{01} = \frac{V_0}{2}\left(1 + \frac{2}{N}\right) \quad (3)$$

$$V_{02} = \frac{V_0}{2}\left(1 - \frac{2}{N}\right) \quad (4)$$

When the output current of the upper rectifier 80 becomes greater than the output current of the lower rectifier 54, the injection current reverses and the insertion voltage becomes negative and of the same magnitude. Since the output currents of the rectifiers are phase-shifted by 30°, both the injection current and voltage are synchronised to them and have a frequency of six times the supply frequency.

Figure 19:
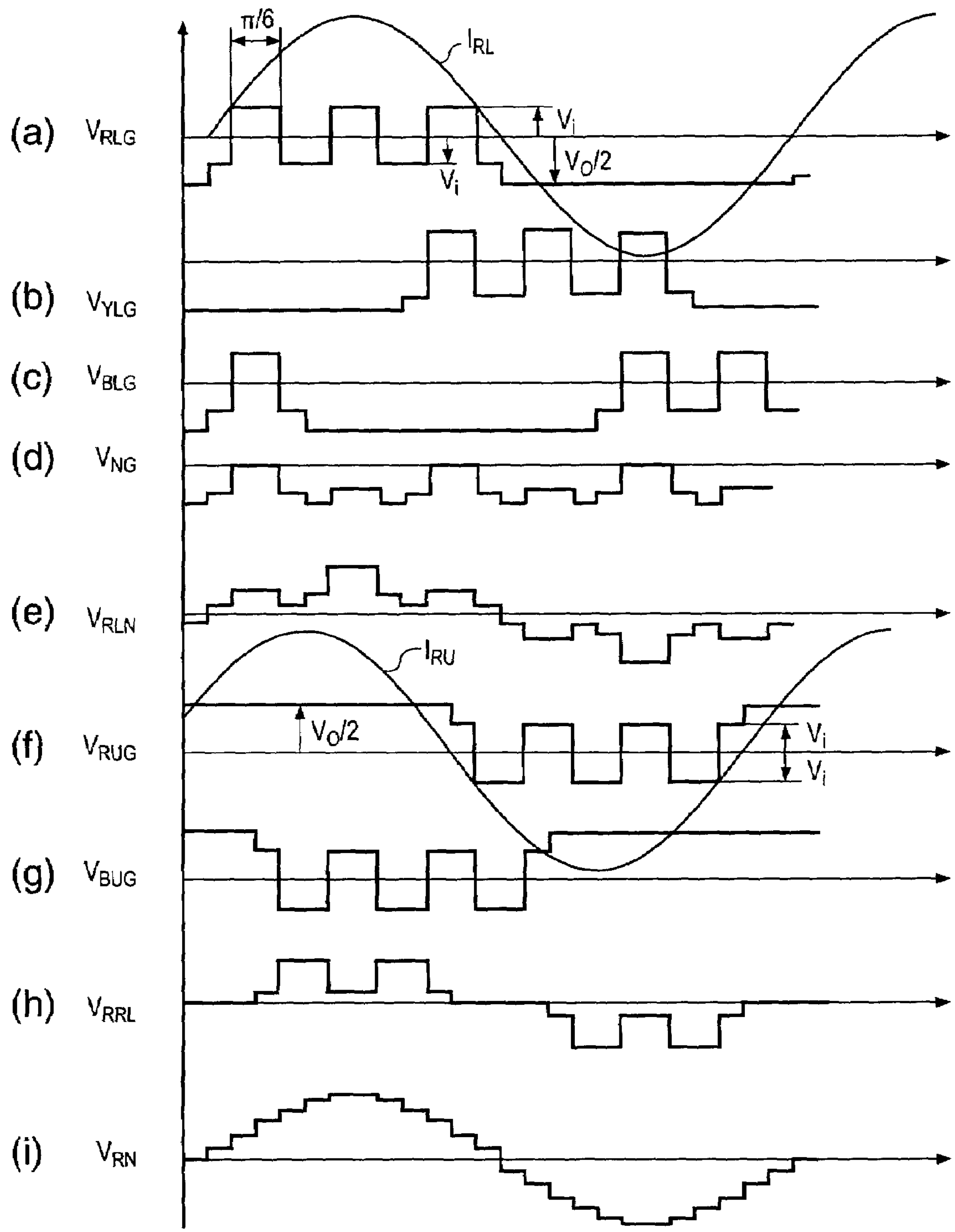
FIGS. 19*a* to 19*i* schematically illustrates voltage waveforms occurring at various points within the circuit shown in FIG. 18.

FIG. 19 shows how the modification of the $V_{O1}$ and $V_{O2}$ waveforms to complementary multi-level stepped shapes results in a 24-pulse shaped waveform at the right hand side of the input inductors.

FIGS. 19*a, b* and *c* first shows the input voltages of the lower rectifier 54 with respect to the mid-point of the output DC link, $V_{RLG}$, $V_{YLG}$ and $V_{BLG}$ respectively. In the convention used herein the subscript 'L' refers to the lower rectifier 54 and the subscript 'U' refers to the upper rectifier 80. When the input current $I_{RL}$ is negative, diode 360 of the $R_L$ leg conducts and the $V_{RLG}$ voltage equals $-V_O/2$. When the input current becomes positive, the terminal $R_L$ is connected to the positive terminal rail of the lower rectifier block 54 by diode 362 becoming conductive, and the voltage $V_{RLG}$ equals the injection voltage $V_{inj}$. The waveforms $V_{YLG}$ and $V_{BLG}$ are identical to $V_{RLG}$ but phase-shifted 120° and 240° respectively.

The common mode voltage $V_{NG}$ shown in FIG. 19*d* is then determined using equation (5), $$V_{NG} = \frac{V_{RLG} + V_{YLG} + V_{BLG}}{3} \quad (5)$$

allowing the calculation of $V_{RLN}$, since $V_{RLN}=V_{RLG}-V_{NG}$. $V_{RLN}$ is shown in FIG. 19*e*.

The $V_{RUG}$ and $V_{BUG}$ input voltages to the upper rectifiers are shown in FIGS. 19*f* and 19*g*. When the input current $I_{RU}$ is positive, the $R_U$ input terminal becomes connected to the positive output of the converter by virtue of diode 364 switching on and consequently the voltage $V_{RUG}$ equals $v_o/2$. When the input current $I_{RU}$ becomes negative, the bottom diode 366 of the $R_U$ leg conducts, connecting $R_U$ to the negative output terminal of the upper rectifier 80. Therefore $V_{RUG}$ equals the injection voltage $V_{inj}$. $V_{BUG}$ is again identical to $V_{RUG}$, but phase shifted by 240°. The $V_{RRL}$ voltage is shown in FIG. 19*h* derived using $V_{RRL}=(V_{RUG}-V_{BUG})/\sqrt{3}$. Finally, the $V_{RN}$ voltage shown in FIG. 19*i* is formed from the addition of $V_{RLN}$ and $V_{RRI}$. A similar set of waveforms may be drawn for the other supply phases, the only difference being the 120° and 240° phase shift.

Figure 20:
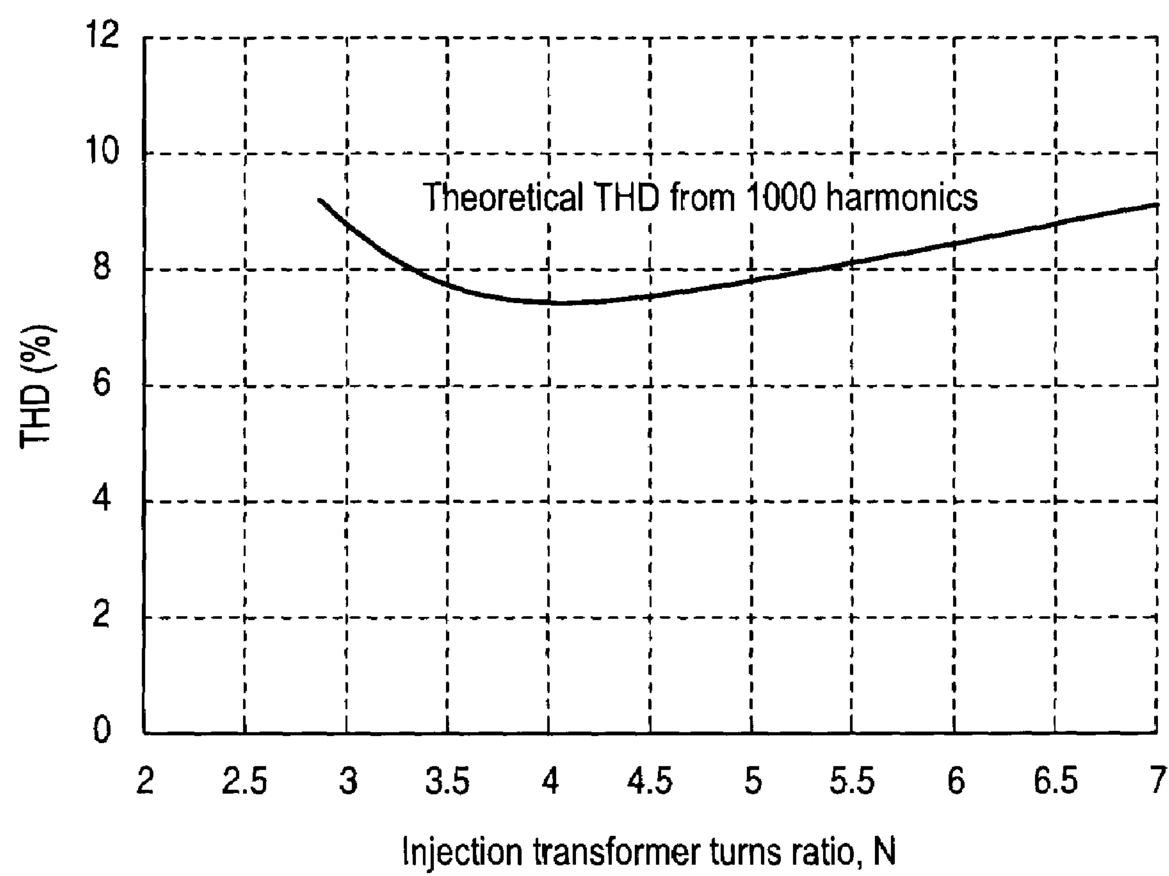
FIG. 20 is a graph showing harmonic distortion versus injection transformer turns ratio for the circuit shown in FIG. 19.

To determine the optimum injection transformer turns ratio, N, the total harmonic distortion, THD of the converter input voltage $V_{RN}$ was calculated from the harmonic Fourier analysis of the line-to-neutral voltage $V_{RN}$ at the right hand side of the line inductor 340. A graph of percentage THD versus the injection transformer turns ratio is shown in FIG. 20. The lowest THD of 7.5% is achieved with a transformer turns ratio of N=4.1. The lowest input line current THD is also achieved for the same turns ratio.

A prototype was built to verify the converter operation. It consisted of a 15 kW Y/Δ transformer with a primary-to-secondary turns ratio of $1/\sqrt{3}$ The primary-referred leakage inductance of the transformer was 111 μH per phase and the series resistance was 0.21Ω per phase. The injection transformer was wound on an EPCOS N87 ETD ferrite core with a turns ratio of N=4. Two polypropylene capacitors of 141 μF were connected in series to form the DC-link output filter to which one end of the winding 301 is attached. The prototype was supplied from a variable frequency solid-state power supply at a phase voltage of 115Vrms and tested over the range of 400 Hz to 800 Hz and a wide range of loads and gave 24 pulse performance.

Figure 21:
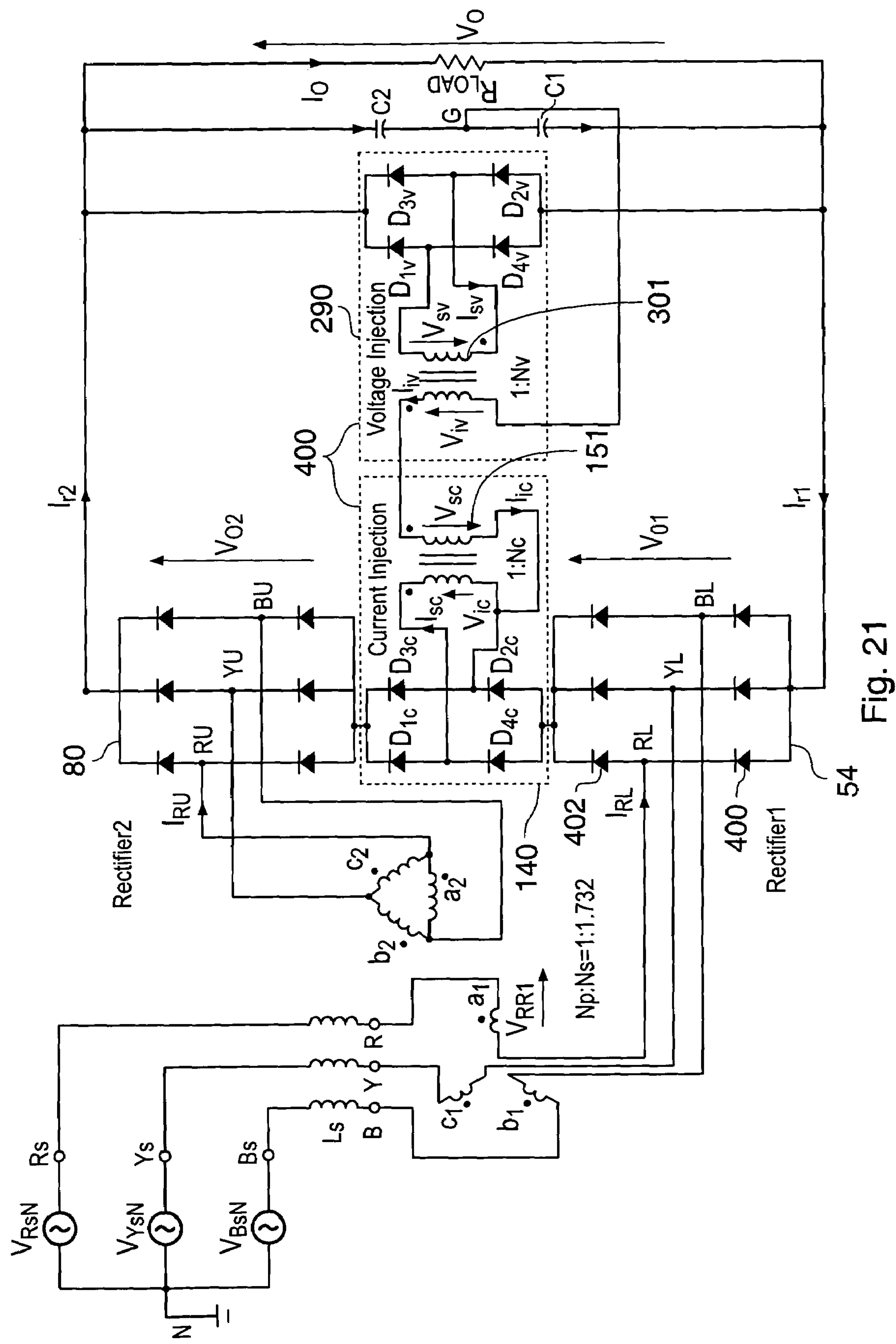
FIG. 21 is a circuit diagram of an embodiment of the present invention utilizing current injection and voltage injection.

The harmonic suppression techniques described hereinbefore, namely the current injection technique described with respect to FIGS. 4 to 14 and the voltage injection technique described with respect to FIGS. 18 to 20 can be combined in a single circuit, for example as shown in FIG. 21.

In essence the harmonic injector, generally designated 400, is a combination of the harmonic injector 140 as shown in FIG. 9 or 10 and the harmonic injector 290 shown in FIG. 18. Each harmonic injector sub-unit 140 and 290 remains essentially as described before. However now the windings 151 and 301 are connected in series in order to ensure that each transformer sees the same current in these windings.

Both the current injection and voltage injection techniques produce complementary stepped multi-level shaped voltages in the outputs of the main rectifiers. As FIG. 22 illustrates, those levels are complementary, therefore the combination of the two techniques produces a four level stepped waveform at the output of the rectifiers 54 and 80, which results in a 36-pulse stepped waveform at the right hand side of the input inductors, i.e. at the positions designated B, Y and R in FIG. 21.

Figure 22:
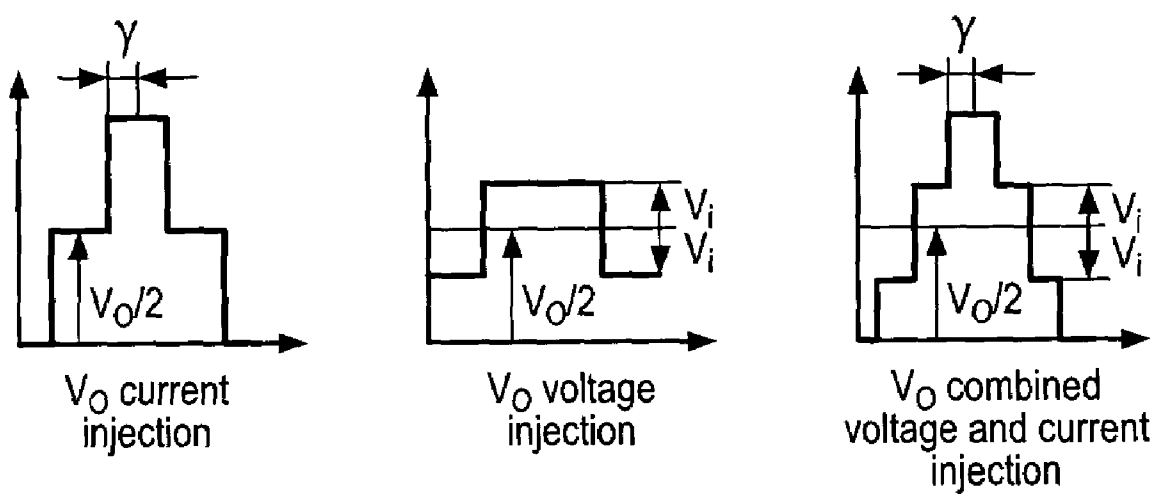
FIG. 22 schematically illustrates the interrelation between the current injection and voltage injection waveforms.

The duration of the angle γ, represented in FIG. 22, depends on the turns ratio $N_C$ of the current injection transformer 140, and the injection voltage level $V_{inj}$ depends on the turns ratio $N_V$ of the voltage injection transformer. Therefore, the optimum shape of the output voltage waveform can be achieved by the appropriate selection of the Nc and Nv turns ratios.

Figure 23:
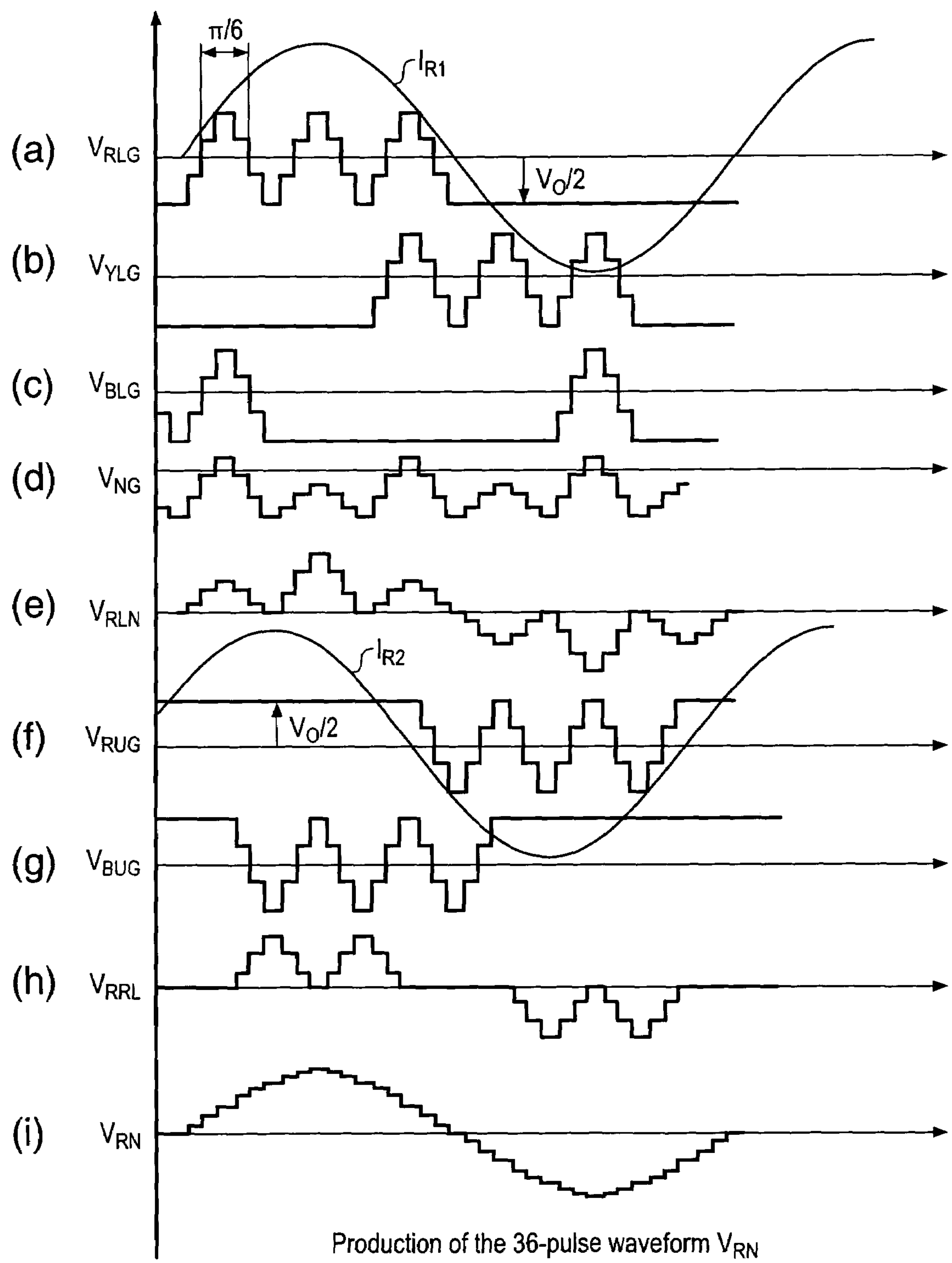
FIGS. 23*a* to 23*i* shows waveforms in the converter circuit shown in FIG. 21.

The main waveforms of the circuit are presented in FIG. 23. The waveform shown in FIG. 23*a* is the voltage of the input terminal R1 (FIG. 21) of the lower rectifier, rectifier 1 and designated 54 for consistency, with respect to the mid-point of the output capacitors G. When the input current $I_{RL}$ is negative, the lower diode 400 of that leg conducts and $V_{RLG}$ is clamped to $$\frac{-V_0}{2}.$$

When the current becomes positive, the upper diode 402 on that leg will conduct and the voltage $V_{RLG}$ will equal $V_{O1}-V_O/2$ where $V_{O1}$ is the output voltage of the lower rectifier 54, $V_{O2}$ is the output voltage of the upper rectifier 80 and $V_O$ is the output voltage of the AC to DC converter. $V_{YLG}$ and $V_{BLG}$ shown in FIGS. 23*b* and 23*c*, respectively, are obtained by phase-shifting by 120° and 240° respectively. Subsequently, $V_{NG}$ is obtained using equation 5 and $V_{RLN}$ by subtracting $V_{NG}$ from $V_{RLG}$ shown in FIGS. 23*d* and 23*e*. The voltage at the input terminal R2 of the top rectifier with respect to the virtual ground G is obtained in a similar manner. When the input current to that terminal, $I_{RU}$ is positive, the top diode of that leg conducts and the $V_{RUG}$ (FIG. 23*f*) voltage equals $V_O/2$. When the $I_{RU}$ is negative, the bottom diode conducts and $V_{RUG}$ equals $(V_O/2)-V_{O2}$ $V_{BUG}$ shown in FIG. 23*g* is obtained by phase-shifting $V_{R2G}$ by 240°. The $V_{RRL}$ voltage of FIG. 23*h* is derived using $V_{RRL}=(V_{RUG}-V_{BUG})/\sqrt{3}$ and, the voltage $V_{RN}$ shown in FIG. 23*i* is formed from the addition of $V_{RLN}$ and $V_{RRL}$. It can be seen that this is an even closer approximation to a sinusoid and has 36 pulse characteristics.

It is thus possible to provide an inexpensive rectifier arrangement with a transformer power rating of approximately 50% of the power required by the load. Furthermore, the passive generation of harmonic waveforms allowing harmonic cancellation of supply currents in the 3-phase supply provides a relatively inexpensive yet reliable system.

The invention claimed is:

1. A converter circuit for converting between an alternating current (AC) supply and a direct current (DC) supply, the converter circuit comprising:

a first semiconductor bridge circuit having first and second DC rails and a plurality of AC rails for connection to an AC bus;

at least one further semiconductor bridge circuit having first and second DC rails and a plurality of AC rails;

at least one phase shifting device; and a harmonic injector, wherein that the or each phase shifting device interconnects an associated one of the further semiconductor bridge circuits to the AC supply, the semiconductor bridge circuits are connected in series, and the harmonic injector is responsive to a harmonic signal developed across at least one of the semiconductor bridge circuits and uses this to form a signal which is used to reduce harmonic interference in the alternating current supply.

2. A converter as claimed in claim 1, in which in order to give rise to the repetitive generation of waveforms across each semiconductor bridge circuit there are no current paths that are completely individual to any one of the semiconductor bridge circuits.

3. A converter as claimed in claim 1, in which a plurality of capacitors are connected in series between DC output rails of the converter so as to define a “central node”, and a current path between the “central node” and a node between the first and further semiconductor bridges is provided by at least one intermediate component which is part of the harmonic injector.

4. A converter as claimed in claim 1, in which the phase shifting device and the first semiconductor bridge circuit are connected in series to the AC supply.

5. A converter as claimed in claim 1, in which the harmonic injector is in series with the semiconductor bridge circuits.

6. A converter as claimed in claim 5, in which the converter only has first and second semiconductor bridge circuits, and the harmonic injector is in series connection between the first and second semiconductor bridge circuits.

7. A converter as claimed in claim 5, in which the harmonic injector comprises a transformer having a first winding and a second winding and a full wave rectifier having a first and second AC terminals and first and second DC terminals, and when the second winding is connected to the AC terminals, and the first winding extends between:

a) a node formed between series connected capacitors connected between the DC outputs of the converter, and a) one of the DC terminals or one of the AC terminals of the full wave rectifier; or a node between the first and second semiconductor bridges.

8. A converter as claimed in claim 5, in which the harmonic injector comprises mirror injector circuits, one in the positive DC output rail and one in the negative DC output rail of the converter, each mirror injector circuit comprising a full wave rectifier comprising.

9. A converter as claimed in claim 1, in which, in use, a current imbalance is generated by the series connected semiconductor bridge circuits which causes the creation of “bypass” paths within the semiconductor bridge circuits.

10. A converter as claimed in claim 9, in which, in use, anti-phase voltages generated as a result of the creation of the bypass paths across the semiconductor bridges are automatically synchronized with the AC supply and are at a harmonic thereof.

11. A converter as claimed in claim 1, in which the harmonic injector injects a harmonic current at a point between the series connected first semiconductor bridge circuit and the further semiconductor bridge circuit.

12. A converter as claimed in claim 1, in which the harmonic injector injects a harmonic voltage between the first semiconductor bridge circuit and the further semiconductor bridge.

13. A converter as claimed in claim 1, in which the harmonic injector implements both harmonic voltage injection and harmonic current injection.

14. A converter as claimed in claim 1, in which each semiconductor bridge circuit is arranged to accept a three phase supply and each semiconductor bridge circuit comprises for each one of the individual AC phases a pair of semiconductor devices in series connection between first and second DC rails with the associated AC phase being connected to a node formed by the interconnection between the pair of semiconductor devices.

15. A converter as claimed in claim 14, in which the semiconductor devices are diodes.

16. A converter as claimed in claim 1, in which the phase shifting device is a 3-phase transformer connected in a delta configuration.

17. A method of reducing total harmonic distortion arising from an AC to DC converter, the method comprising:

providing first and second three phase passive rectifiers in series, with the second rectifier being supplied via a delta connected transformer and the first rectifier being supplied by connection to a star connected transformer or via series connection to the primary windings of the delta connected transformer, and wherein a common current path is provided through the first and second rectifiers such that instantaneous current conflicts cause the creation of “by-pass” current paths through one or other of the rectifiers giving rise to the generation of a waveform at 6 times the supply frequency which is used to drive an harmonic injector compensation circuit for injecting a harmonic waveform at a node between the first and second rectifiers.

* * * * *